(12) United States Patent
Alvarez Dominguez et al.

(10) Patent No.: US 10,616,422 B2
(45) Date of Patent: Apr. 7, 2020

(54) APPARATUSES AND METHODS FOR ALTERNATIVE SPONSORED DATA SERVICES

(71) Applicant: Telefonaktiebolaget LM Ericsson (publ), Stockholm (SE)

(72) Inventors: Rodrigo Alvarez Dominguez, Madrid (ES); Miguel Angel Muñoz De La Torre Alonso, Madrid (ES); Alfonso de Jesus Perez Martinez, Madrid (ES)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 2 days.

(21) Appl. No.: 15/747,472

(22) PCT Filed: Jul. 27, 2015

(86) PCT No.: PCT/EP2015/067137
§ 371 (c)(1),
(2) Date: Jan. 25, 2018

(87) PCT Pub. No.: WO2017/016586
PCT Pub. Date: Feb. 2, 2017

(65) Prior Publication Data
US 2018/0220009 A1    Aug. 2, 2018

(51) Int. Cl.
*H04M 11/00* (2006.01)
*H04M 15/00* (2006.01)
(Continued)

(52) U.S. Cl.
CPC .......... *H04M 15/858* (2013.01); *H04L 12/14* (2013.01); *H04L 12/1407* (2013.01);
(Continued)

(58) Field of Classification Search
CPC ............... H04M 15/858; H04M 15/61; H04M 15/8214; H04M 15/09; H04M 15/8083;
(Continued)

(56) References Cited

U.S. PATENT DOCUMENTS

2011/0270722 A1    11/2011  Cai et al.
2012/0084425 A1*    4/2012  Riley ................... H04M 15/00
                                               709/223
(Continued)

OTHER PUBLICATIONS

PCT International Search Report for International application No. PCT/EP2015/067137—dated Apr. 4, 2016.
(Continued)

*Primary Examiner* — Khoi H Tran
*Assistant Examiner* — B M M Hannan
(74) *Attorney, Agent, or Firm* — Patent Portfolio Builders, PLLC

(57) ABSTRACT

The present invention faces the issue of a user ignoring an alternative second service usable instead of a first service that the user is using, and which is a service subscribed by the user. To solve this issue, the present invention provides for associating a first service identifier and a second service identifier with a same service category at a subscription repository; upon detecting at a policy enforcer the first service is used by the user, notifying a policy controller of the first service identifier; obtaining, by the policy controller from the subscription repository, the second service identifier associated with the same service category as the first service identifier; offering the user, either directly from the policy controller or via the policy enforcer, to accept using the second service instead of the used first service; and, upon user accepting to use the second service, enforcing control rules for the second service at the policy enforcer.

12 Claims, 11 Drawing Sheets

(51) Int. Cl.
*H04L 12/14* (2006.01)
*H04L 29/08* (2006.01)
*H04W 4/24* (2018.01)

(52) U.S. Cl.
CPC .......... *H04L 67/306* (2013.01); *H04M 15/09* (2013.01); *H04M 15/61* (2013.01); *H04M 15/8083* (2013.01); *H04M 15/8214* (2013.01); *H04L 12/1475* (2013.01); *H04L 12/1496* (2013.01); *H04M 15/64* (2013.01); *H04M 15/66* (2013.01); *H04M 2215/0192* (2013.01); *H04W 4/24* (2013.01)

(58) Field of Classification Search
CPC ................. H04M 15/64; H04M 15/66; H04M 2215/0192; H04L 12/14; H04L 67/306; H04L 12/1407; H04L 12/1496; H04L 12/1475; H04W 4/24
USPC ........................................................ 455/408
See application file for complete search history.

(56) References Cited

U.S. PATENT DOCUMENTS

| | | | |
|---|---|---|---|
| 2012/0216249 A1 | 8/2012 | Fernandez Alonso et al. | |
| 2012/0290452 A1* | 11/2012 | Pancorbo Marcos | H04L 12/1407 705/30 |
| 2013/0279521 A1 | 10/2013 | Perez Martinez et al. | |
| 2014/0040975 A1* | 2/2014 | Raleigh | H04W 12/12 726/1 |
| 2014/0237129 A1* | 8/2014 | Castro Castro | H04L 12/14 709/228 |
| 2015/0319315 A1* | 11/2015 | Chai | H04L 12/1407 455/406 |
| 2015/0373523 A1* | 12/2015 | Jeong | H04W 4/24 455/406 |
| 2017/0111181 A1* | 4/2017 | Zhou | H04W 24/04 |
| 2018/0077293 A1* | 3/2018 | Chai | H04W 4/24 |
| 2019/0259097 A1* | 8/2019 | Raleigh | H04W 4/24 |
| 2019/0273825 A1* | 9/2019 | Chai | H04M 17/20 |

OTHER PUBLICATIONS

3GPP TR 23.813 v11.0.0; Technical Report; 3rd Generation Partnership Project; Technical Specification Group Services and System Aspects; Study on Policy solutions and enhancements (Release 11)—Jun. 2011.

3GPP TS 23.203 v13.4.0; Technical Specification; 3rd Generation Partnership Project; Technical Specification Group Services and System Aspects; Policy and charging control architecture (Release 13)—Jun. 2015 Note: Due to size, this document has been split into three parts.

3GPP TS 23.335 v12.0.0; Technical Specification; 3rd Generation Partnership Project; Technical Specification Group Core Network and Terminals; User Data Convergence (UDC); Technical realization and information flows; Stage 2 (Release 12)—Sep. 2014.

3GPP TS 29.212; Technical Specification; 3rd Generation Partnership Project; Technical Specification Group Core Network and Terminals; Policy and Charging Control (PCC); Reference points (Release 13)—Jun. 2015 Note: Due to size, this document has been split into three parts.

PCT Written Opinion of the International Searching Authority for International application No. PCT/EP2015/067137—dated Apr. 4, 2016.

* cited by examiner

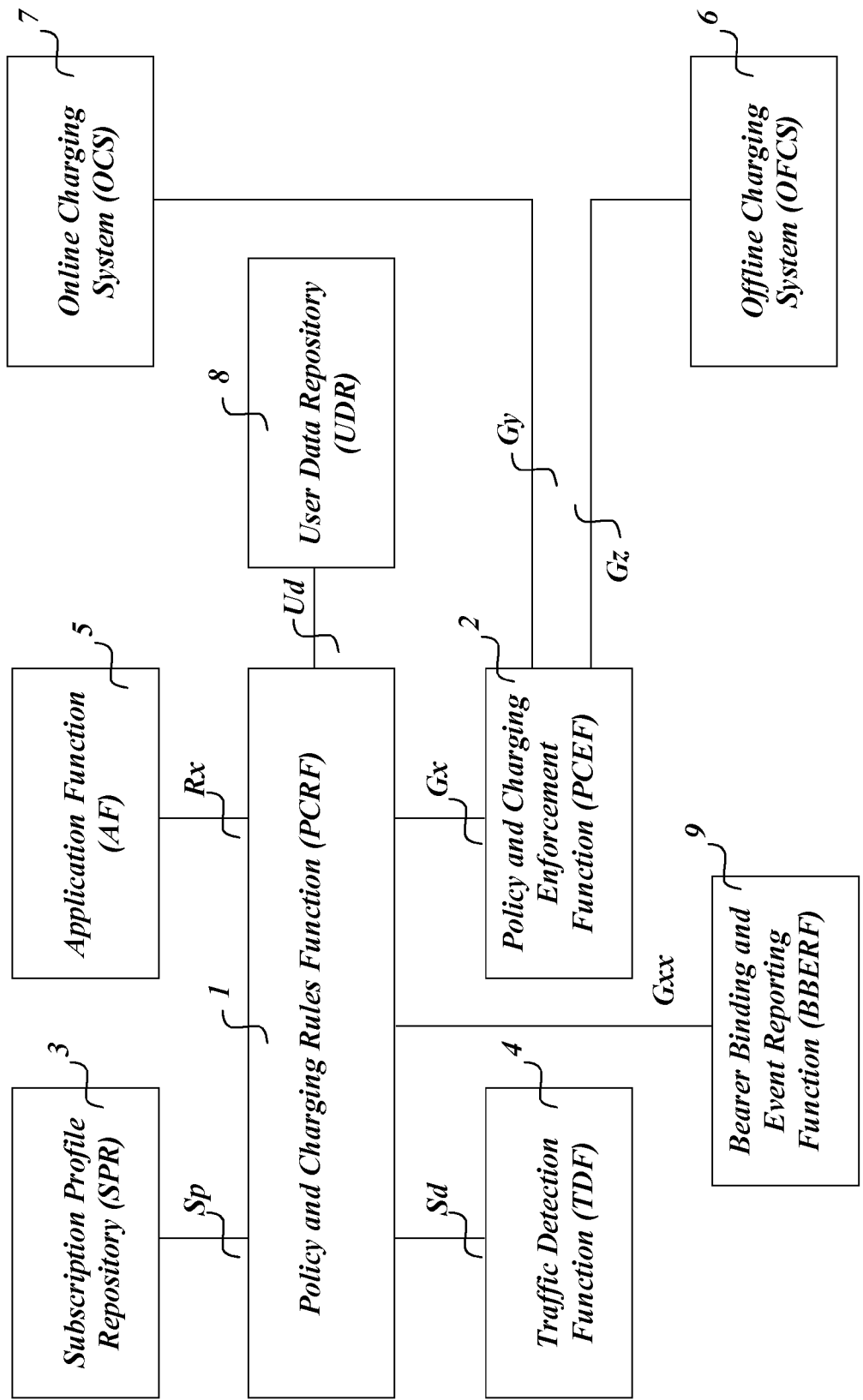
FIG. -1-

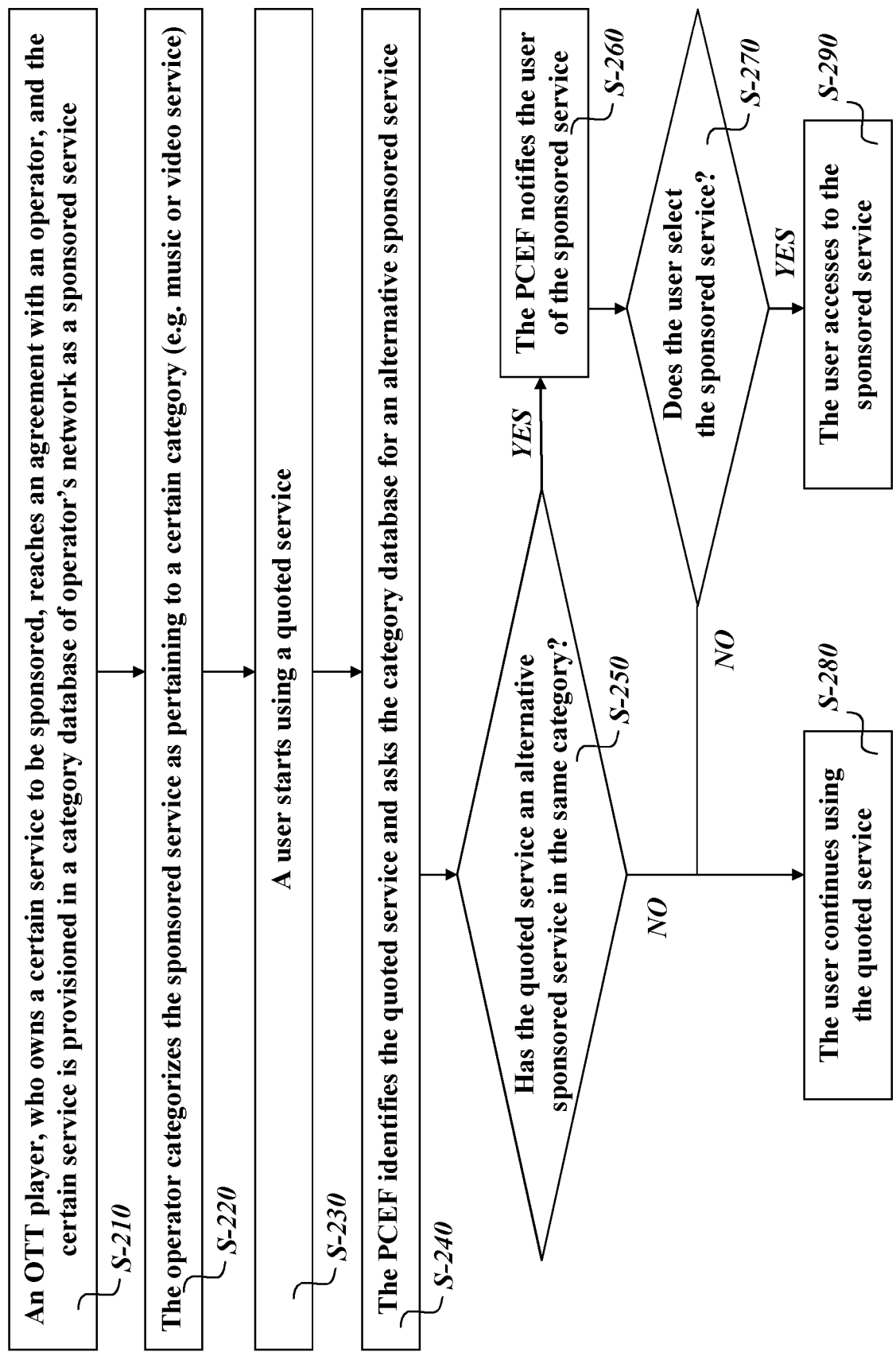
FIG. -2-

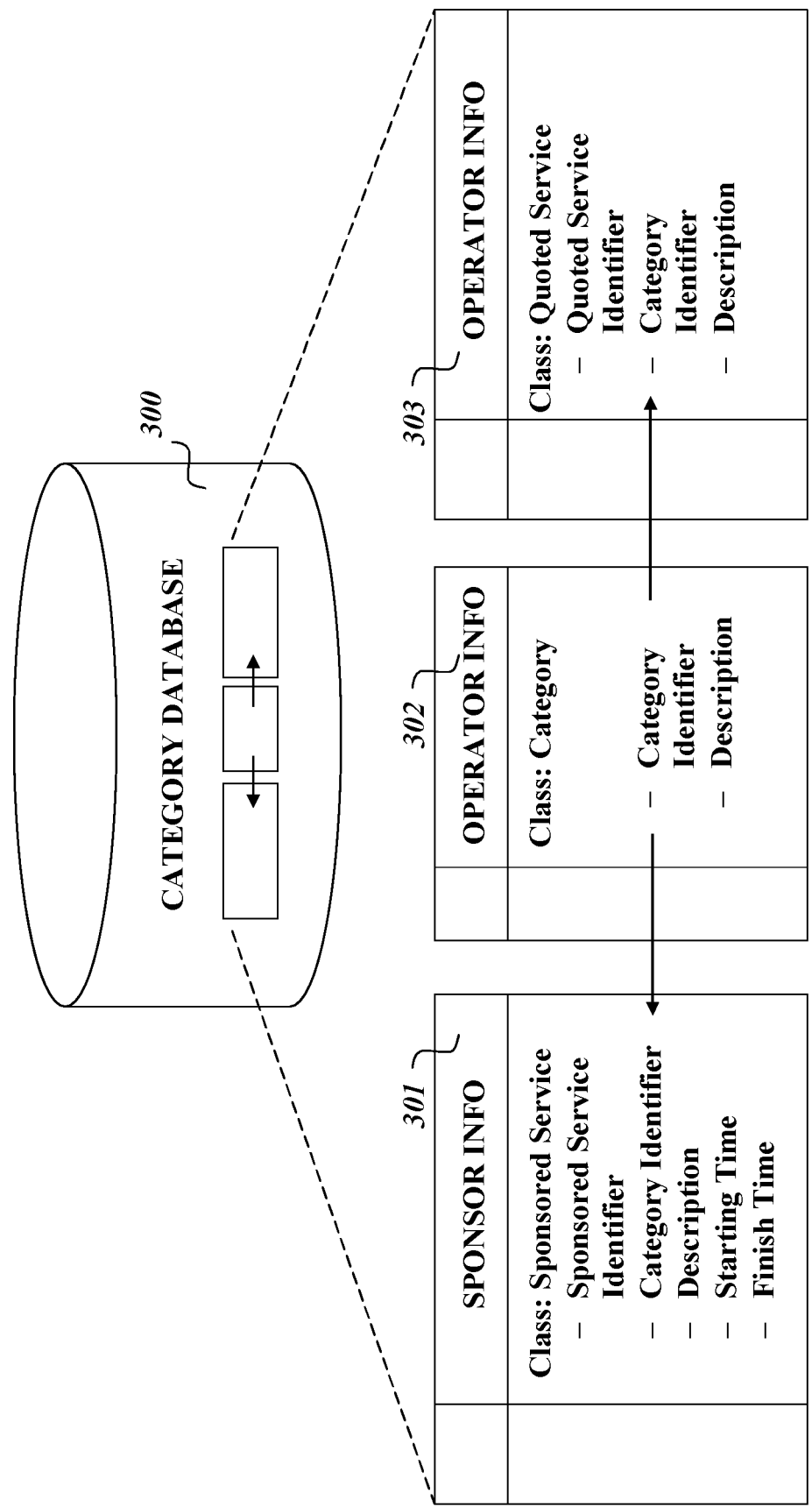
FIG. -3-

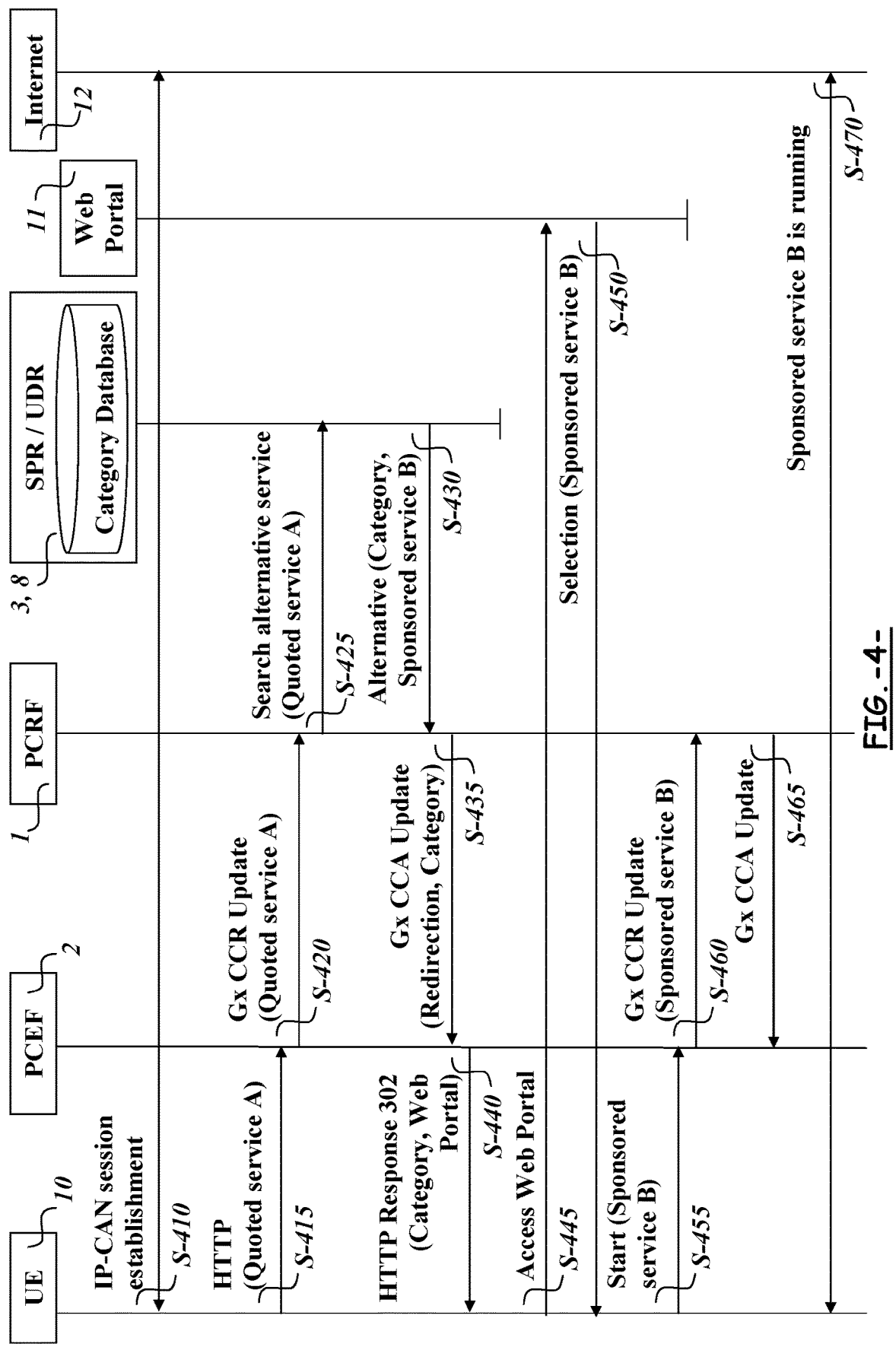
FIG. -4-

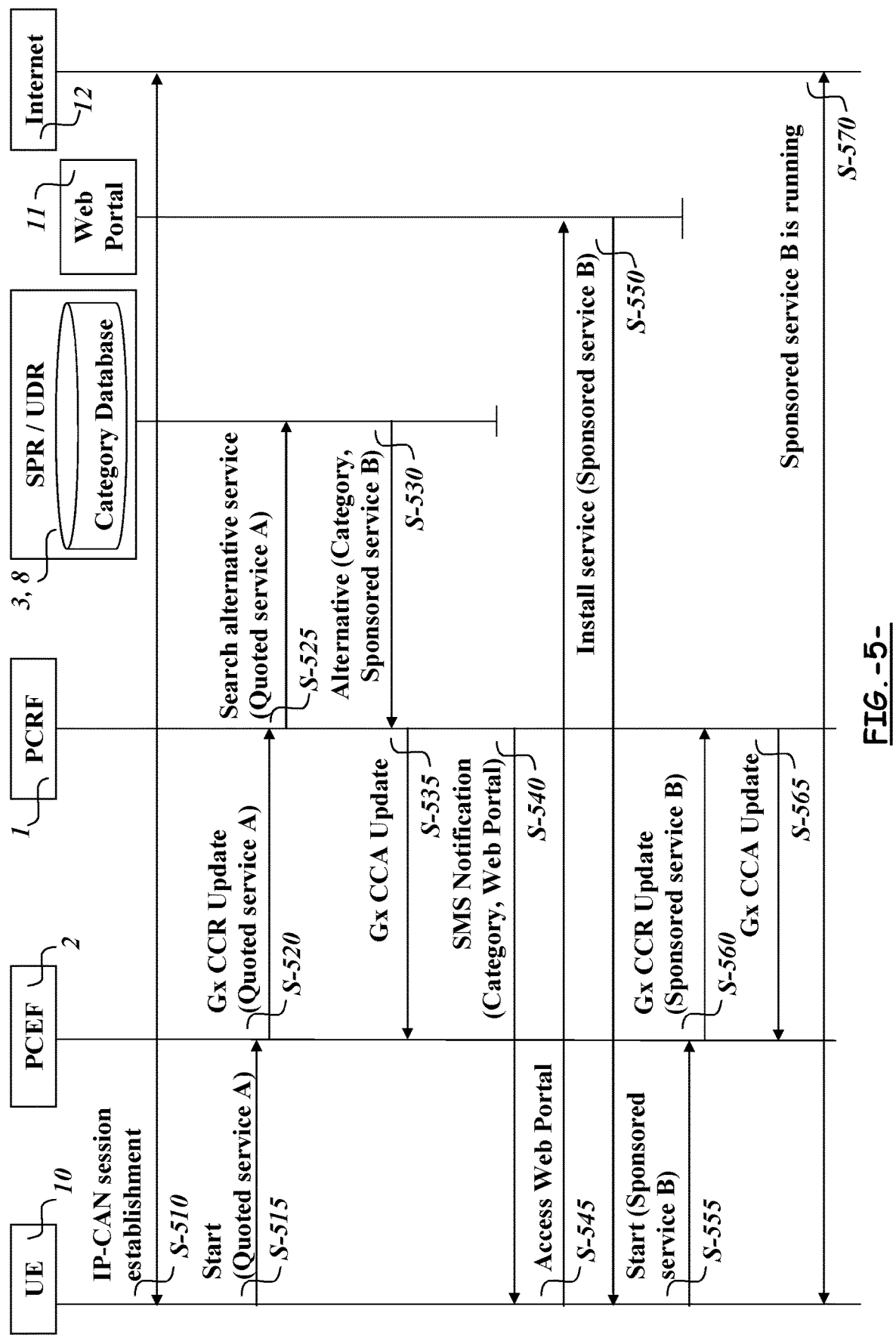
FIG. -5-

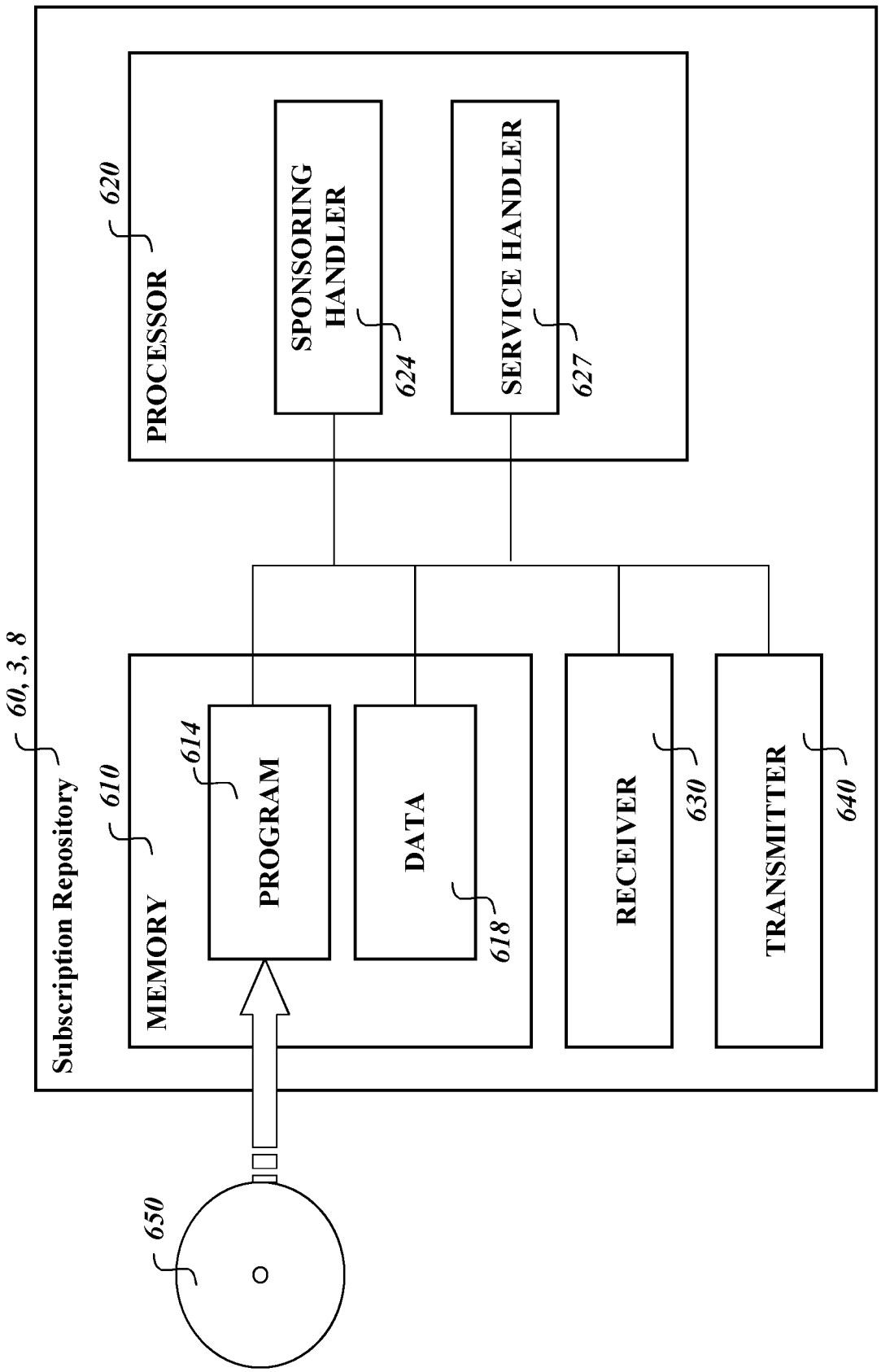
FIG. -6-

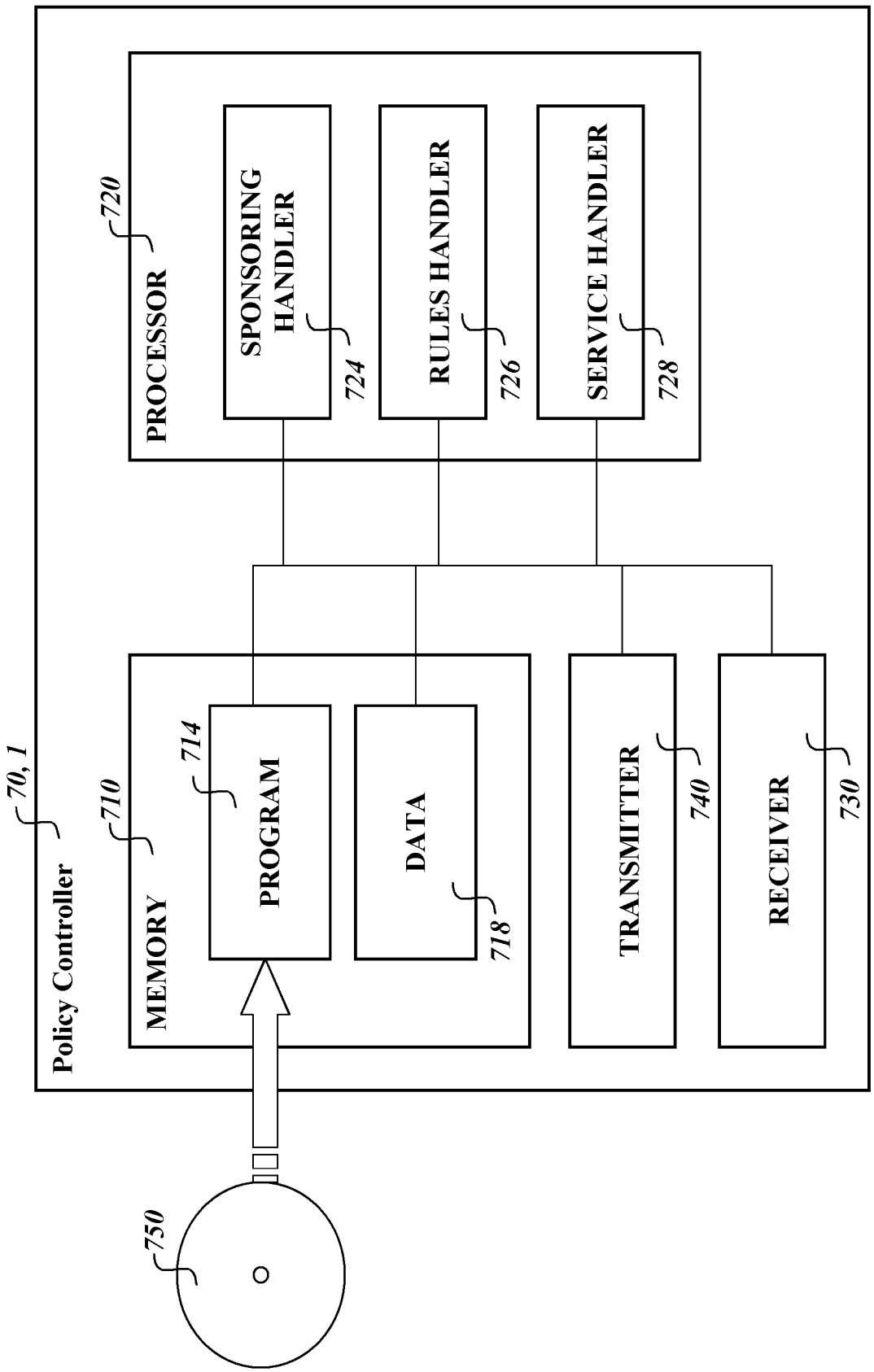
FIG. -7-

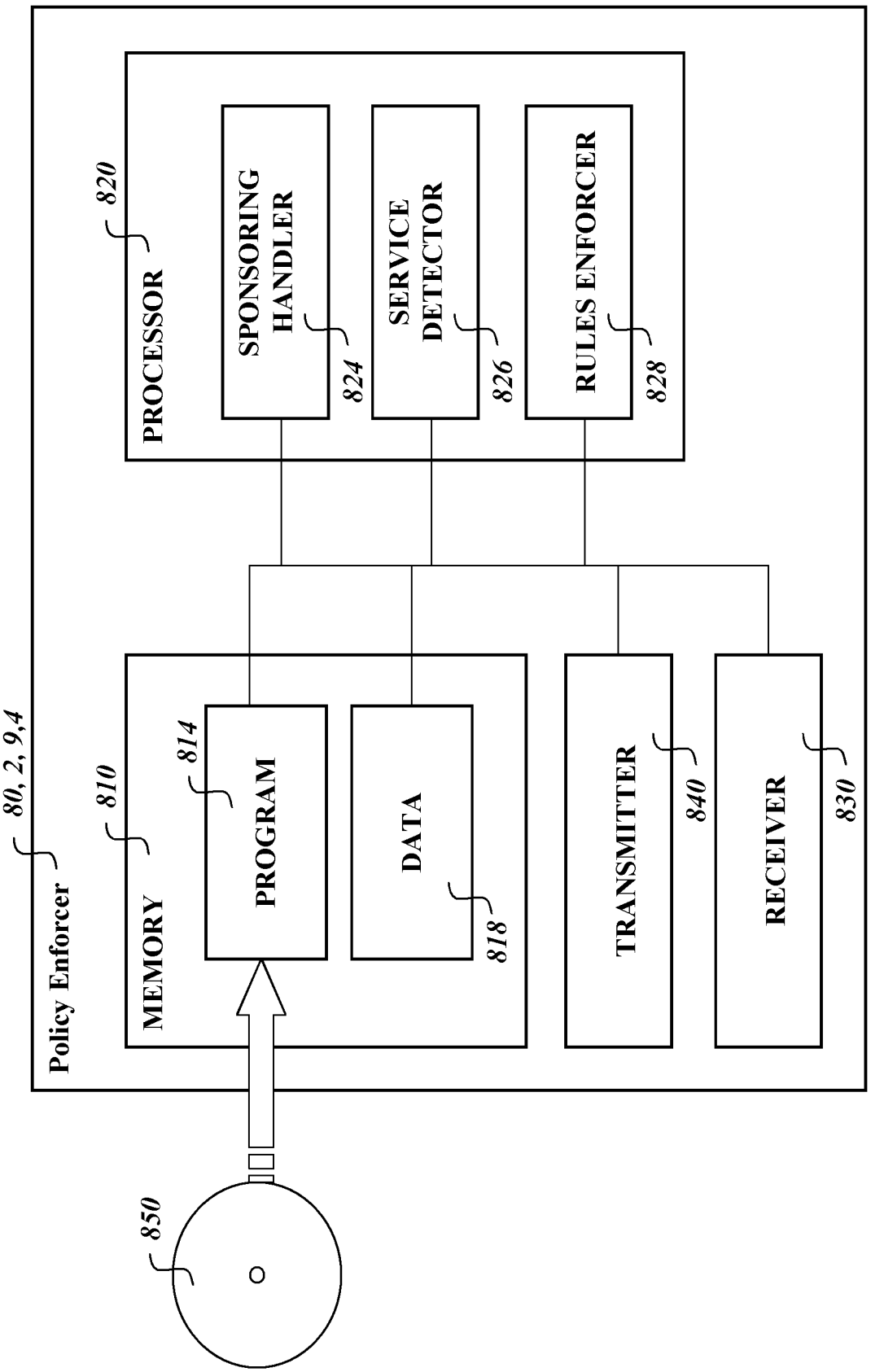
FIG. -8-

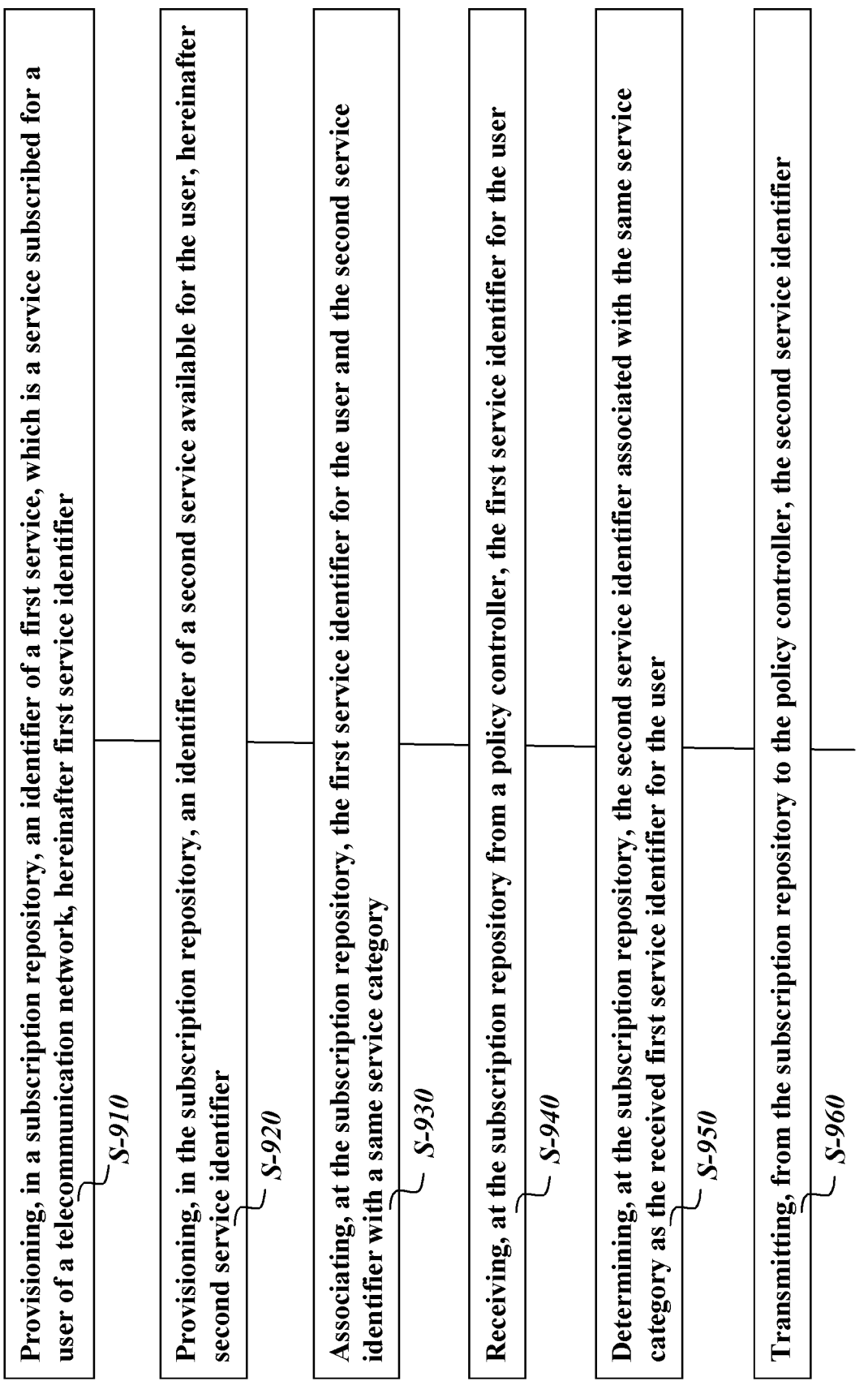
FIG. -9-

Transmitting, from a policy controller to a policy enforcer, a control rule for a first service, which is a service subscribed for a user
⎿ S-1010

Receiving, at the policy controller from the policy enforcer, an identifier of the first service, hereinafter first service identifier, indicating the first service is used by the user
⎿ S-1020

Obtaining, at the policy controller from a subscription repository and by using the first service identifier, an identifier of a second service, hereinafter second service identifier, associated with a same service category as the received first service identifier
⎿ S-1030

Triggering, from the policy controller towards the user, an offer to accept using the second service instead of the used first service
⎿ S-1040

Receiving, at the policy controller from the policy enforcer, a request for control rules for the second service for the user
⎿ S-1050

Transmitting, from the policy controller to the policy enforcer, a control rule for the second service for the user
⎿ S-1060

FIG. -10-

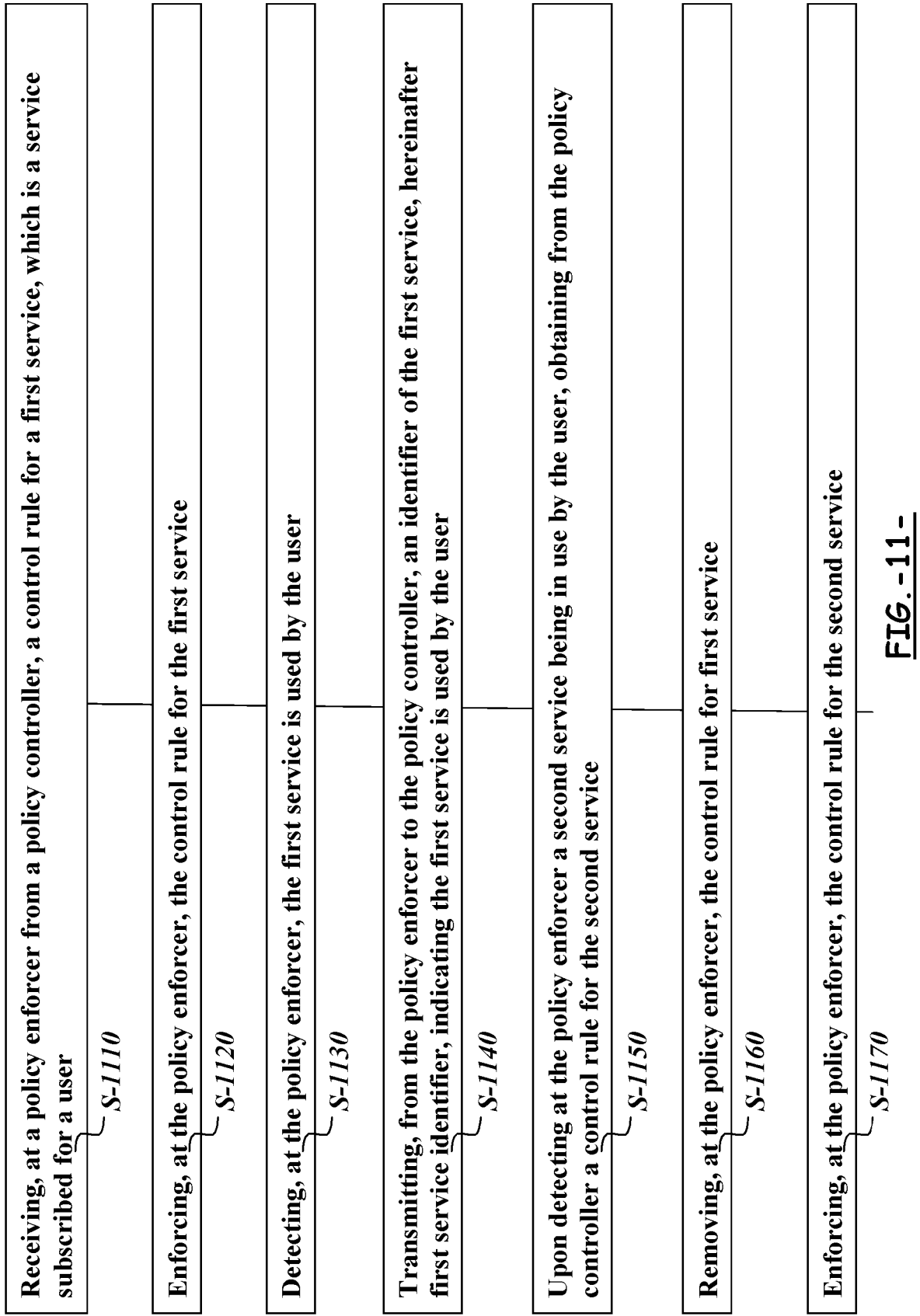

APPARATUSES AND METHODS FOR ALTERNATIVE SPONSORED DATA SERVICES

PRIORITY

This non provisional application is a U.S. National Stage Filing under 35 U.S.C. § 371 of International Patent Application Serial No, PCT/EP2015/067137 filed Jul. 27, 2015, and entitled "Apparatuses And Methods For Alternative Sponsored Data Services."

TECHNICAL FIELD

The present invention generally relates to handling of alternative sponsored data service; and, more specifically, the invention relates to sponsoring awareness by users.

BACKGROUND

The Policy and Charging Control (PCC) architecture is illustrated in FIG. 1 and disclosed in 3GPP TS 23.203 V13.4.0 that specifies the PCC functionality for Evolved 3GPP Packet Switched domain, including both 3GPP accesses (GERAN/UTRAN/E-UTRAN) and Non-3GPP accesses. For the purpose of the present invention, the PCC architecture includes a Policy and Charging Rules Function (PCRF), a Policy and Charging Enforcement Function (PCEF), a Traffic Detection Function (TDF), a Subscription Profile Repository (SPR) and an Online Charging System (OCS) to allow charging decisions.

The PCRF is in charge of policy control decision and flow based charging control, and provides network control for service data flow detection, gating, quality of service (QoS) and flow based charging towards the PCEF by holding policies and providing PCC rules to the PCEF per service data flow basis for enforcement of such policies.

The PCEF encompasses service data flow detection, policy enforcement and flow based charging functionalities by enforcing the PCC rules received from the PCRF. Deep Packet Inspection (DPI) technology, embedded in PCEF, supports packet inspection and service classification, which consists on IP packets classified according to a configured tree of rules so that they are assigned to a particular service session.

The TDF, as specified in 3GPP TR 23.813 V11.0.0, is in charge of performing application's traffic detection and reporting of the detected application to the PCRF, it supports packet inspection and service classification, in accordance with Application Detection and Control (ADC) rules received from the PCRF, and can be either stand-alone or collocated with the PCEF. Where the PCEF includes the TDF, it may also be referred to as a PCEF with deep packet inspection (DPI) capabilities, and the PCC rules include the ADC rules.

This PCC architecture may also include a Bearer Binding and Event Reporting Function (BBERF) which, for the purpose of the present invention, behaves in a similar manner and for a similar purpose as the PCEF, but for receiving and handling Quality of Service (QoS) rules instead of PCC rules. The PCC architecture may also include an Application Function (AF) which is an element offering applications that require dynamic policy and/or charging control over the IP Connectivity Access Network (IP-CAN) user plane behaviour. The AF communicates with the PCRF through an Rx reference point to transfer dynamic session information, required for PCRF decisions as well as to receive IP-CAN specific information and notifications about IP-CAN bearer level events.

3GPP TS 29.212 V13.2.0 specifies the operations on PCC rules, ADC rules and QoS rules, as well as the particular parameters that a PCC rule, an ADC rule and a QoS rule may comprise. The PCC rules, ADC rules and QoS rules may be dynamic rules provisioned by the PCRF, or static rules respectively predefined at the PCEF, TDF and BBERF. The operations available for dynamic rules are: installation, modification and removal; whereas the operations available for static rules are: activation and deactivation.

A PCC rule and a QoS rule include a service data flow filter used to identify a service data flow, and one or more service data flow filters are used to select the traffic for which the PCC rule and the QoS rule applies. An ADC rule includes a TDF application identifier used to reference the corresponding application, for which the ADC rule applies. The same application identifier value can occur in more than one ADC rule and, if so, the PCRF ensures that there is at most one ADC rule active per application identifier value at any time.

The SPR is in charge of providing subscription data for a user to the PCRF and contains all subscription-related information needed for subscription-based policies. Apart from that, a User Data Repository (UDR), as disclosed in 3GPP TS 23.335 V12.0.0, may replace the SPR for provision of subscription data to the PCRF.

3GPP TS 23.203 discloses a Gx reference point (interface) between the PCRF and the PCEF, an Sd reference point between the PCRF and the stand-alone TDF, an Sp reference point between the PCRF and the SPR, a Gxx reference point between the PCRF and the BBERF, an Ud reference point between the PCRF and the UDR, and a Gy reference point between the PCEF and the OCS.

In particular, the PCEF may be located at e.g. a gateway GPRS support node (GGSN) in a general packet radio service (GPRS) core network. The GPRS core network allows 2G, 3G and WCDMA mobile networks to transmit IP packets to external networks such as the Internet. For the cases where there is a Proxy Mobile IP (PMIP) protocol instead of a GPRS tunnelling protocol (GTP) between a Bearer Binding and Event Reporting Function (BBERF) and the PCEF, the bearer control is done in the BBERF instead. Moreover, the PCEF may also be located at e.g. a packet data network gateway (PGW) in an evolved packet system (EPS) network. The PGW, which may also be abbreviated as PDN GW, is the point of interconnect between the evolved packet core (EPC) and the external IP networks. Furthermore, the PCEF may also be located at e.g. a packet data gateway (PDG) for connecting an untrusted WLAN network with a 3GPP network. In this scenario, the PDG may be a gateway to a specific packet data network, such as the internet or an operator service network.

At present, a Sponsor (e.g. an Application Service Provider, ASP) is an entity taking the operator's charge for connectivity. That is, the Sponsor can pay for user's data usage in order to allow the user to access sponsored services implemented on one or more Sponsor nodes, e.g. an ASP service implemented on an ASP node, of a telecommunication network. A Sponsor node may be co-located on a same platform as other nodes, e.g. servers and devices, mentioned throughout this specification, or separately. For the sake of simplicity, the Sponsor node may simply be referred in the following as the Sponsor. This enables additional revenue opportunities for both the ASPs and the operators. In particular, a dynamic data usage provided by the Sponsor allows the operator to increase revenues from the users with limited data plans. The user may have limited data plans allowing only a nominal data volume per month and the Sponsor may dynamically sponsor additional volume for the user to allow access to the sponsored services offered by the ASPs. In this respect, 3GPP TR 23.813 specifies Sponsored Data Connectivity for basic sponsoring use cases through Rx and Gx reference points.

The PCC architecture can be enhanced to enable such use cases. In particular, the PCC architecture allows the operator to provide service control based on such sponsored services. For example, it allows a dynamic IP flow to be excluded from the user's data plan since a Sponsor might sponsor the data usage for the identified IP flows. For example, the user may use the limited data plan to browse an online store for interesting books; but once a book is purchased, the data usage for downloading the book can be granted for free. In addition, the IP flow may also be granted certain level of QoS (e.g. video streaming). Currently, as specified in 3GPP TR 23.813, sponsored data connectivity is notified from an AF of the PCC architecture to the PCRF. The AF is connected with the ASP, which sponsors the data connectivity, and with the PCRF via the Rx reference point. In operation, once the user accesses the ASP node to run the sponsored service, the ASP triggers towards the AF the required data connectivity to sponsor the sponsored service, and the AF submits to the PCRF the sponsored data connectivity for the sponsored service. The PCRF only needs to know the required information to identify the service and to describe the sponsored IP flows towards the PCEF with derived PCC rules.

Even though current solutions allow users to get and use sponsored services, the users cannot previously know which the sponsored services are and, if a user ignores the existence of a sponsored service, such user would instead use a subscribed service subject to a subscribed quota, e.g. a quoted service subject to charging by the user's operator. In other words, the users should be aware of the sponsored services before being able to use them.

SUMMARY

The present invention is aimed to at least minimize the above drawbacks and provides for a subscription repository, a policy controller, a policy enforcer and respectively executed methods for notifying a user of a service sponsored by a sponsor, hereinafter a sponsored service.

In addition to at least minimizing the above drawbacks in the context of the mentioned quoted service and sponsored service scenario, the invention may also be used in a more general context of a first and a second service, where the second service may be an alternative service to the first service in providing for example better quality of service, more extensive service, advertisement free service, different range of service, cheaper service, different bandwidth/speed or different type of service (like for example extending a speech call to a video call).

Throughout this specification, a PCRF server is a network element configured to carry out the functionality of a PCRF in accordance with conventional PCC standards; a PCEF device is a network element configured to carry out the functionality of a PCEF in accordance with conventional PCC standards; a TDF device is a network element configured to carry out the functionality of a TDF in accordance with conventional PCC standards; a BBERF device is a network element configured to carry out the functionality of a BBERF in accordance with conventional PCC standards; a UDR is a network element configured to carry out the functionality of a UDR in accordance with conventional PCC standards; and an SPR is a network element configured to carry out the functionality of an SPR in accordance with conventional PCC standards. In addition, the PCRF server, the PCEF device, the TDF device, the BBERF device, the UDR and the SPR throughout this specification are enhanced to accomplish the objects of the present invention.

In accordance with a first aspect of the present invention, there is provided a method for notifying a user of a second service available for the user instead of a first service, which is a service subscribed for the user, the method executed at a subscription repository.

This method comprises provisioning an identifier of the first service, which is a service subscribed for a user of a telecommunication network, hereinafter first service identifier; provisioning an identifier of the second service available for the user, hereinafter second service identifier; and associating the first service identifier for the user and the second service identifier with a same service category.

This method also comprises receiving, from a policy controller, the first service identifier for the user; determining the second service identifier associated with the same service category as the received first service identifier for the user; and transmitting, to the policy controller, the second service identifier.

Advantageously in this method, the second service may be a service for which data connectivity is sponsored by a Sponsor and is hereinafter referred to as a sponsored service; and the first service may be a service subject to a quota subscribed for the user and is hereinafter referred to as a quoted service. In particular, a quota may be a value indicating a volume and/or time available to use the service, or a volume and/or time already spent by the service.

Where the second service is a sponsored service and the first service is a quoted service in this method, provisioning the sponsored service identifier may comprise provisioning an identifier of the Sponsor, hereinafter sponsor identifier, which is advantageous to immediately know which is the Sponsor sponsoring the data connectivity for the sponsored service. Where this is the case, transmitting the sponsored service identifier may comprise transmitting the corresponding sponsor identifier.

Irrespectively of handling sponsored service and quoted service, this method may further comprise providing to the policy controller the first service identifier identifying the first service, which is a service subscribed for the user.

In accordance with a second aspect of the present invention, there is provided a method for notifying a user of second a service available for the user instead of a first service, which is a service subscribed for the user, the method executed at a policy controller.

This method comprises transmitting, to a policy enforcer, a control rule for the first service, which is a service subscribed for the user.

This method also comprises receiving, from the policy enforcer, an identifier of the first service, hereinafter first service identifier, indicating that the first service is used by the user; obtaining, from a subscription repository and by using the first service identifier, an identifier of the second service, hereinafter second service identifier, associated with a same service category as the received first service identifier; and triggering, towards the user, an offer to accept using the second service instead of the used first service.

This method further comprises receiving, from the policy enforcer, a request for control rules for the second service for the user; and transmitting, to the policy enforcer, a control rule for the second service.

Also advantageously in this method, the second service may be a service for which data connectivity is sponsored by a Sponsor and is hereinafter referred to as a sponsored service; and the first service may be a service subject to a quota subscribed for the user and is hereinafter referred to as a quoted service. In particular, a quota may be a value indicating a volume and/or time available to use the service, or a volume and/or time already spent by the service.

Particularly in this method, triggering towards the user the offer to accept using the second service may comprise transmitting to the policy enforcer an indication to offer the user an acceptance of using the second service instead of the used first service. Where the second service is a sponsored service and the first service is a quoted service in this method, and especially advantageous where the quoted service is an http service, triggering towards the user the offer to accept using the sponsored service may comprise transmitting to the policy enforcer an indication to offer the user an acceptance of using the sponsored service instead of the used quoted service.

Also in particular for this method, triggering towards the user the offer to accept using the second service may comprise transmitting to the user the offer to accept using the second service instead of the used first service. Where the second service is a sponsored service and the first service is a quoted service in this method, and especially advantageous where the quoted service is a non-http service, triggering towards the user the offer to accept using the sponsored service may comprise transmitting to the user the offer to accept using the sponsored service instead of the used quoted service.

Irrespective of handling sponsored service and quoted service, transmitting the control rule for the first service, which is a service subscribed for the user, may be responsive to receiving, from the policy enforcer, a request for control rules for services subscribed for the user.

In an embodiment of this method, obtaining the second service identifier may comprise transmitting, to the subscription repository, the first service identifier for the user; and receiving, from the subscription repository, the second service identifier. In another, the second service identifier may be obtained from a category database locally allocated into the policy controller.

In any case, this method may further comprise obtaining from the subscription repository the first service identifier identifying the first service, which is a service subscribed for the user.

In accordance with a third aspect of the present invention, there is provided a method for notifying a user of a second service available for the user instead of a first service, which is a service subscribed for the user, the method executed at a policy enforcer.

This method comprises receiving, from a policy controller, a control rule for the first service, which is a service subscribed for a user; and enforcing the control rule for the first service.

This method also comprises detecting the first service is used by the user; and transmitting, to the policy controller, an identifier of the first service, hereinafter first service identifier, indicating that the first service is used by the user.

This method further comprises, upon detecting the second service being in use by the user, obtaining from the policy controller a control rule for the second service; removing the control rule for the first service; and enforcing the control rule for the second service.

Also advantageously in this method, the second service may be a service for which data connectivity is sponsored by a Sponsor and is hereinafter referred to as a sponsored service; and the first service may be a service subject to a quota subscribed for the user and is hereinafter referred to as a quoted service. In particular, a quota may be a value indicating a volume and/or time available to use the service, or a volume and/or time already spent by the service.

Given that a quoted service is a service subject to a quota subscribed for the user, upon detecting the quoted service is used by the user, this method may further comprise determining a quota to report quota usage for the quoted service.

In this case, upon detecting the sponsored service being in use by the user, this method may further comprise reporting the quota usage for the quoted service previously used. In particular, the quota usage may be reported from the policy enforcer to an OCS.

Aligned with the method executed at the policy controller, this method may further comprise receiving, from the policy controller, an indication to offer the user an acceptance for using the second service instead of the used first service. In this case, this method may further comprise notifying the user of the second service and, upon the acceptance by the user, redirecting the user to start using the second service.

Where the second service is a sponsored service and the first service is a quoted service in this method, and where the quoted service is an http service, this method may further comprise receiving, from the policy controller, an indication to offer the user an acceptance for using the sponsored service instead of the used quoted service. In this case, this method may further comprise notifying the user of the sponsored service and, upon the acceptance by the user, redirecting the user to start using the sponsored service.

In accordance with a fourth aspect of the present invention, there is provided an apparatus for holding subscription data for a user of a telecommunication network.

In accordance with an embodiment, this apparatus may comprise at least one processor and at least one memory that stores processor-executable instructions, wherein the at least one processor interfaces with the at least one memory to execute the processor-executable instructions, whereby said apparatus may be operable to perform the actions discussed in the following.

This apparatus may thus be operable to store, in a memory, an identifier of a first service, which is a service subscribed for a user of a telecommunication network, hereinafter first service identifier; store, in the memory, an identifier of a second service available for the user, hereinafter second service identifier; and associate, in the memory, the first service identifier for the user and the second service identifier with a same service category.

This apparatus may also be operable to receive, from a policy controller via a receiver, the first service identifier for the user; determine, with a processor, the second service identifier associated with the same service category as the received first service identifier for the user; and transmit, to the policy controller via a transmitter, the second service identifier.

In accordance with another embodiment, this apparatus may comprise a memory configured to store an identifier of a first service, which is a service subscribed for a user of a telecommunication network, hereinafter first service identifier. This memory may also be configured to store an identifier of a second service available for the user, hereinafter second service identifier, and associate the first service identifier for the user and the second service identifier with a same service category.

Also in accordance with this another embodiment, this apparatus may comprise a service handler configured to receive via a receiver, from a policy controller, the first service identifier for the user; a processor configured to determine the second service identifier associated with the same service category as the received first service identifier for the user; and a sponsoring handler configured to transmit via a transmitter, to the policy controller, the second service identifier.

In both embodiments for this apparatus, the second service may be a service for which data connectivity is sponsored by a Sponsor and is hereinafter referred to as a sponsored service, and the first service may be a service subject to a quota subscribed for the user and is hereinafter referred to as a quoted service.

Where the second service is a sponsored service and the first service is a quoted service in both embodiments, this apparatus may further be operable to store, in the memory, a sponsor identifier identifying the Sponsor sponsoring the data connectivity for the sponsored service; and, where this is the case, this apparatus may further be operable to transmit, to the policy controller via the transmitter, the sponsor identifier along with the sponsored service identifier.

Irrespectively of handling sponsored service and quoted service and also in both embodiments, this apparatus may further be operable to provide, to the policy controller via the transmitter, the first service identifier identifying the first service, which is a service subscribed for the user.

This apparatus may be any one of a subscription repository, a subscription profile repository, a category database, and a user data repository. Nothing in this specification prevents from combining elements between the two embodiments disclosed above for this apparatus.

In accordance with a fifth aspect of the present invention, there is provided an apparatus for providing control rules to be enforced for services subscribed for a user of a telecommunication network.

In accordance with an embodiment, this apparatus may comprise at least one processor and at least one memory that stores processor-executable instructions, wherein the at least one processor interfaces with the at least one memory to execute the processor-executable instructions, whereby said apparatus may be operable to perform the actions discussed in the following.

This apparatus may thus be operable to transmit, to a policy enforcer via a transmitter, a control rule for a first service, which is a service subscribed for a user.

This apparatus may also be operable to receive, from the policy enforcer via a receiver, an identifier of the first service, hereinafter first service identifier, indicating that the first service is used by the user; obtain, from a subscription repository and by using the first service identifier, an identifier of a second service, hereinafter second service identifier, associated with a same service category as the received first service identifier; and trigger, towards the user via the transmitter, an offer to accept using the second service instead of the used first service.

This apparatus may also be operable to receive, from the policy enforcer via the receiver, a request for control rules for the second service for the user; and transmit, to the policy enforcer via the transmitter, a control rule for the second service.

In accordance with another embodiment, this apparatus may comprise a memory configured to store a control rule for a first service, which is a service subscribed for a user; and a rules handler configured to transmit, to a policy enforcer via a transmitter, said control rule for the first service, which is a service subscribed for the user.

Also in accordance with this another embodiment, this apparatus may comprise a service handler configured to receive, from the policy enforcer via a receiver, an identifier of the first service, hereinafter first service identifier, indicating that the first service is used by the user; a processor configured to obtain, from a subscription repository and by using the first service identifier, an identifier of a second service, hereinafter second service identifier, associated with a same service category as the received first service identifier; and a sponsoring handler configured to trigger, towards the user via the transmitter, an offer to accept using the second service instead of the used first service.

Further in this another embodiment, the rules handler may be configured to receive, from the policy enforcer via the receiver, a request for control rules for the second service for the user, and transmit, to the policy enforcer via the transmitter, a control rule for the second service.

In both embodiments for this apparatus, the second service may be a service for which data connectivity is sponsored by a Sponsor and is hereinafter referred to as a sponsored service, and the first service may be a service subject to a quota subscribed for the user and is hereinafter referred to as a quoted service.

Particularly for both embodiments in order to trigger the offer, this apparatus may further be operable to transmit, to the policy enforcer via the transmitter, an indication to offer, from the policy enforcer to the user, acceptance of using the second service instead of the used first service. Where the second service is a sponsored service and the first service is a quoted service, and especially advantageous where the quoted service is an http service, this apparatus may further be operable to transmit, to the policy enforcer via the transmitter, an indication to offer, from the policy enforcer to the user, acceptance of using the sponsored service instead of the used quoted service.

Also in particular for both embodiments in order to trigger the offer, this apparatus may further be operable to transmit, to the user via the transmitter, the offer to accept using the second service instead of the used first service. Where the second service is a sponsored service and the first service is a quoted service, and especially advantageous where the quoted service is a non-http service, this apparatus may further be operable to transmit, to the user via the transmitter, the offer to accept using the sponsored service instead of the used quoted service.

In both embodiments and irrespective of handling sponsored service and quoted service, this apparatus may further be operable to transmit via the transmitter the control rule for the first service, which is a service subscribed for the user, in response to receiving, from the policy enforcer via the receiver, a request for control rules for services subscribed for the user.

Also in both embodiments and in order to obtain the second service identifier, this apparatus may further be operable to transmit, to the subscription repository via the transmitter, the first service identifier for the user, and receive, from the subscription repository via the receiver, the second service identifier.

Also in both embodiments, this apparatus may further be operable to obtain, from the subscription repository via the receiver, the first service identifier identifying the first service, which is a service subscribed for the user.

This apparatus may be any one of a policy controller, and a policy and charging rules function, PCRF, server. Nothing in this specification prevents from combining elements between the two embodiments disclosed above for this apparatus.

In accordance with a sixth aspect of the present invention, there is provided an apparatus for enforcing control rules for services subscribed for a user of a telecommunication network.

In accordance with an embodiment, this apparatus may comprise at least one processor and at least one memory that stores processor-executable instructions, wherein the at least one processor interfaces with the at least one memory to execute the processor-executable instructions, whereby said apparatus may be operable to perform the actions discussed in the following.

This apparatus may thus be operable to receive, from a policy controller via a receiver, a control rule for a first service, which is a service subscribed for a user; and enforce, with a processor, the control rule for the first service.

This apparatus may also be operable to detect, with the processor, the first service is used by the user; and transmit, to the policy controller via a transmitter, an identifier of the first service, hereinafter first service identifier, indicating that the first service is used by the user.

This apparatus may further be operable to detect, with the processor, a second service being in use by the user; obtain, from the policy controller via the receiver, a control rule for the second service; remove, with the processor, the control rule for the first service; and enforce, with the processor, the control rule for the second service.

In accordance with another embodiment, this apparatus may comprise a memory configured to store a control rule for a first service, which is a service subscribed for a user; and a rules enforcer configured to receive, from a policy controller via a receiver, the control rule for the first service, which is a service subscribed for a user, and enforce said control rule for the first service.

Also in accordance with this another embodiment, this apparatus may comprise a service detector configured to detect the first service is used by the user, transmit, to the policy controller via a transmitter, an identifier of the first service, hereinafter first service identifier, indicating that the first service is used by the user, and detect a second service being in use by the user.

Still in accordance with this another embodiment, this apparatus may comprise a sponsoring handler configured to obtain, from the policy controller via the receiver, a control rule for the second service. Where this is the case, the rules enforcer may further be configured to remove the control rule for the first service, and enforce the control rule for the second service.

In both embodiments for this apparatus, the second service may be a service for which data connectivity is sponsored by a Sponsor and is hereinafter referred to as a sponsored service, and the first service may be a service subject to a quota subscribed for the user and is hereinafter referred to as a quoted service.

In both embodiments and where the second service is a sponsored service and the first service is a quoted service, upon detecting the quoted service is used by the user, this apparatus may further be operable to determine, with the processor, a quota to report quota usage for the quoted service. Where this is the case, upon detecting the sponsored service being in use by the user, this apparatus may further be operable to report the quota usage for the quoted service previously used.

Also in both embodiments, this apparatus may further be operable to receive, from the policy controller via the receiver, an indication to offer the user an acceptance for using the second service instead of the used first service. In this case, this apparatus may further be operable to notify the user, via the transmitter, of the second service and, upon the user acceptance, redirect the user, with the processor, to start using the second service.

Also in both embodiments, where the second service is a sponsored service and the first service is a quoted service, and especially advantageous where the quoted service is an http service, this apparatus may further be operable to receive, from the policy controller via the receiver, an indication to offer the user an acceptance for using the sponsored service instead of the used quoted service. In this case, this apparatus may further be operable to notify the user, via the transmitter, of the sponsored service and, upon the user acceptance, redirect the user, with the processor, to start using the sponsored service.

This apparatus may be any one of a policy enforcer, a policy and charging enforcement function, PCEF, device, a traffic detection function, TDF, device, and a bearer binding and event reporting function, BBERF, device. Nothing in this specification prevents from combining elements between the two embodiments disclosed above for this apparatus.

On the other hand, the invention may be practised by one or more computer programs, in accordance with a further aspect of the invention, the one or more computer programs being loadable into an internal memory of one or more computers with input and output units as well as with one or more processors, and comprising executable code adapted to carry out the above methods. In particular, this executable code may be recorded in a carrier readable in the computer.

BRIEF DESCRIPTION OF THE DRAWINGS

The features, objects and advantages of the invention will become apparent by reading this description in conjunction with the accompanying drawings, in which:

FIG. 1 illustrates a PCC architecture in accordance with 3GPP TS 23.203 V13.4.0, the PCC architecture complemented with a UDR in accordance with 3GPP TS 23.335 V12.0.0.

FIG. 2 shows an exemplary sequence of actions that may be performed by different entities to let a user be aware of, and optionally select, a sponsored service.

FIG. 3 shows an exemplary association between a sponsored service, a quoted service and a same category that both sponsored service and quoted service share.

FIG. 4 illustrates an exemplary sequence of actions to be carried out in accordance with a first embodiment suitable for HTTP based quoted and sponsored services.

FIG. 5 illustrates an exemplary sequence of actions to be carried out in accordance with a first embodiment suitable for non-HTTP based quoted and sponsored services.

FIG. 6 shows a basic component structure of a subscription repository, such as e.g. an SPR or a UDR.

FIG. 7 shows a basic component structure of a policy controller, such as e.g. a PCRF server.

FIG. 8 shows a basic component structure of a policy enforcer, such as e.g. a PCEF device, BBERF device or TDF device.

FIG. 9 represents an embodiment of a method for notifying a user of a second service available for a user instead of a first service, which is a service subscribed for the user, the method executed at a subscription repository.

FIG. 10 represents an embodiment of a method for notifying a user of a second service available for a user instead of a first service, which is a service subscribed for the user, the method executed at a policy controller.

FIG. 11 represents an embodiment of a method for notifying a user of a second service available for the user instead of a first service, which is a service subscribed for the user, the method executed at a policy enforcer.

DETAILED DESCRIPTION

The following describes currently preferred embodiments of apparatuses and methods for notifying a user of a second service available for the user instead of a first service, which is a service subscribed for the user. More particularly, the following also describes a subscription repository, a policy controller, a policy enforcer and respectively executed methods for notifying a user of a service sponsored by a sponsor, hereinafter a sponsored service, available for the user instead of a quoted service, which is a service subscribed for the user and subject to a quota for the user.

As already commented above, apart from the invention being applicable in the context of the mentioned quoted service and sponsored service scenario, the invention may also be used in a more general context of a first and a second service, where the second service may be an alternative service to the first service in providing for example better quality of service, more extensive service, advertisement free service, different range of service, cheaper service, different bandwidth/speed or different type of service like, for example, extending a speech call to a video call.

In this respect, the following describes generic methods for notifying a user of a second service available for the user instead of a first service, which is a service subscribed for the user, respectively executed at a subscription repository, a policy controller and a policy enforcer, carried in the context of first and second services, and illustrated in FIG. 9, FIG. 10 and FIG. 11.

The following also describes embodiments of specific methods for notifying a user of a sponsored service available for the user instead of a quoted service, which is a service subscribed by the user and subject to a quota subscribed by the user, thus carried out in the context of quoted and sponsored services, and illustrated in FIG. 2, FIG. 4 and FIG. 5.

On the other hand, the apparatuses contributing in notifying a user of a second service available for the user instead of a first service, which is a service subscribed for the user, are described in the following just with reference to specific implementations of such apparatuses, i.e. a subscription repository, a policy controller and a policy enforcer, carried in the context of first and second services, as well as in the context of quoted and sponsored services, and illustrated in FIG. 6, FIG. 7 and FIG. 8.

In particular, the policy controller 70 illustrated in FIG. 7 may be a PCRF server 1 of the PCC architecture with reference to FIG. 1. Also in particular, the policy enforcer 80 illustrated in FIG. 8 may be any one of a PCEF device 2, a BBERF device 9 and a TDF device 4 of the PCC architecture with reference to FIG. 1. Further in particular, the subscription repository 60 may be one of an SPR 3 and a UDR 8 of the PCC architecture with reference to FIG. 1, and a category database 300 with reference to FIG. 3.

Moreover, the PCEF device 2, the BBERF device 9 and TDF device 4 may co-exist in at least some embodiments discussed throughout this specification, so that nothing prevents the policy controller from communicating with more than one policy enforcer, even if not all the exemplary policy enforcers are illustrated in drawings.

FIG. 9 illustrates a method for notifying a user of a second service available for the user instead of a first service, which is a service subscribed for the user, the method executed at a subscription repository. Also in particular, and with reference to FIG. 1, the subscription repository 60 illustrated in FIG. 6 may be any one of an SPR 3 and a UDR 8.

As shown in FIG. 9, this method comprises a step S-910 of provisioning an identifier of the first service, which is a service subscribed for a user of a telecommunication network, hereinafter first service identifier; a step S-920 of provisioning an identifier of the second service available for the user, hereinafter second service identifier; and a step S-930 of associating the first service identifier for the user and the second service identifier with a same service category.

In particular, the second service may be a service for which data connectivity is sponsored by a Sponsor and is hereinafter referred to as a sponsored service, and the first service may be a service subject to a quota subscribed for the user and is hereinafter referred to as a quoted service. Where this is the case, provisioning the sponsored service identifier may comprise a step of provisioning an identifier of the Sponsor sponsoring the data connectivity for the sponsored service. That is, each sponsored service may be associated with the corresponding Sponsor, e.g. Application Service Provider, sponsoring the sponsored service.

This method further comprises a step S-940 of receiving, from a policy controller 70, the first service identifier for the user; a step S-950 of determining the second service identifier associated with the same service category as the received first service identifier for the user; and a step S-960 of transmitting, to the policy controller, the second service identifier.

In particular, where the second service is a sponsored service and the first service is a quoted service, transmitting the sponsored service identifier may comprise, where the sponsored service is associated with the corresponding Sponsor, transmitting the corresponding sponsor identifier.

This method may further comprise a step of providing to the policy controller the first service identifier identifying the first service, which is a service subscribed for the user.

Participating in this method and exemplary embodiments there is provided a subscription repository 60, as schematically illustrated in FIG. 6.

In accordance with an embodiment, the subscription repository 60 may comprise, as shown in FIG. 6, a memory 618 configured to store an identifier of a first service, which is a service subscribed for a user of a telecommunication network, hereinafter first service identifier.

In this embodiment, the memory 618 is also configured to store an identifier of a second service available for the user, hereinafter second service identifier, and associate the first service identifier for the user and the second service identifier with a same service category.

Also in accordance with this embodiment, the subscription repository 60 may comprise, as shown in FIG. 6, a service handler 627 configured to receive via a receiver 630, from a policy controller, the first service identifier for the user; a processor 620 configured to determine the second service identifier associated with the same service category as the received first service identifier for the user; and a sponsoring handler 624 configured to transmit via a transmitter 640, to the policy controller, the second service identifier.

The subscription repository 60 shown in FIG. 6 may also comprise at least one processor 620 and at least one memory 610, both in communication with each other, with the sponsoring handler 624, the service handler 627, the receiver 630 and the transmitter 640, and with other elements or units of the subscription repository 60. The at least one memory 610 may comprise volatile and/or non-volatile memory. In particular, the at least one memory 610 may have a computer program 614 and data 618 stored therein. The computer program 614 may be loaded in the at least one memory 610 from a computer program product 650, such as any non-transitory computer readable medium, in which the computer program is stored. The data 618 may comprise respective identifiers for one or more first services subscribed for the user, e.g. quoted services, respective identifiers for one or more second services available for the user, e.g. sponsored services, and at least one service category associated with a first service and a second service provisioned at the subscription repository 60. The at least one processor 620 may be configured to carry out the functions of the sponsoring handler 624 and the service handler 627.

In accordance with a further embodiment, the subscription repository 60 may comprise, as shown in FIG. 6, at least one processor 620, and at least one memory 610 that stores processor-executable instructions 614. In this subscription repository, the at least one processor interfaces with the at least one memory to execute the processor-executable instructions, so that the subscription repository is operable to perform the actions disclosed in the following.

The subscription repository is thus operable to store, in a memory 618, an identifier of a first service, which is a service subscribed for a user of the telecommunication network, which was provisioned during the step S-910 in the above method, and hereinafter referred to as first service identifier, store, in the memory 618, an identifier of a second service available for the user, hereinafter second service identifier, which was provisioned during the step S-920 in the above method, and associate, in the memory 618, the first service identifier for the user and the second service identifier with a same service category, as carried out during the step S-930 in the above method.

This subscription repository 60 is also operable to receive, from a policy controller via a receiver 630, the first service identifier for the user, as carried out during the step S-940 in the above method, determine, with a processor 620, the second service identifier associated with the same service category as the received first service identifier for the user, as carried out during the step S-950 in the above method, and transmit, to the policy controller via a transmitter 640, the second service identifier.

In both embodiments for this subscription repository 60, the second service may be a service for which data connectivity is sponsored by a Sponsor and is hereinafter referred to as a sponsored service, and the first service may be a service subject to a quota subscribed for the user and is hereinafter referred to as a quoted service.

In both embodiments and where the second service is a sponsored service and the first service is a quoted service, the subscription repository 60 may further be operable to store, in the memory, a sponsor identifier identifying the Sponsor sponsoring the data connectivity for the sponsored service; and may further be operable to transmit, to the policy controller via the transmitter, the sponsor identifier along with the sponsored service identifier.

Also in both embodiments, the subscription repository 60 may further be operable to provide, to the policy controller via the transmitter, the first service identifier identifying the first service, which is a service subscribed for the user.

Regarding the provision of the first service identifier, the provision of the second service identifier, and the association of the first service identifier and the second service identifier with a same service category, an exemplary embodiment is illustrated in FIG. 3 in the context of a quoted service identifier and a sponsored service identifier.

FIG. 3 illustrates a category database 300, which in particular may be included in the memory 618 of the subscription repository 60, and may comprise sponsor information 301 and operator information 302 and 303. Possible actors involved with contents of the category database may be the operator, who provisions quoted services and category of each quoted service, and the sponsor, who provisions its sponsored services and may provision the category of each sponsored service.

The sponsor information 301 may, for each sponsored service class, comprise a sponsored service identifier, a description, a starting time and a finish time, and be associated with a category identifier.

The operator information 303 may, for each quoted service class, comprise a quoted service identifier and a description, and be associated with a category identifier.

This category identifier, which may be associated with a quoted service class and a sponsored service class, is included along with a corresponding description in a category class of the operator information 302, which may comprise a plurality of category classes.

The relationship illustrated in FIG. 3 follows the following schema:

Class: Sponsored Service [0 . . . n]: provision by sponsor.
Sponsored Service Identifier [1]: Mandatory attribute. Key identifier of the class.
Category Identifier [1]: Mandatory attribute. Foreign Key identifier of the class Category.
Description [0 . . . 1]: User label to help the operator to remember the meaning of the sponsored service identifier.
Time:
Starting Time: YYYY-MM-DD; HH:MM:SS
Finish Time: YYYY-MM-DD; HH:MM:SS
Class: Category [1 . . . n]: provision by operator.
Category Identifier [1]: Mandatory attribute. Key identifier of the class.
Description [0 . . . 1]: User label to help the operator to remember the meaning of the sponsored service identifier.
Class: Quoted Service [1 . . . n]: provision by operator.
Quoted Service Identifier [1]: Mandatory attribute. Key identifier of the class.
Category Identifier [1]: Mandatory attribute. Foreign Key identifier of the class Category.
Description [0 . . . 1]: User label to help the operator to remember the meaning of the quoted service identifier.

FIG. 10 illustrates a method for notifying a user of a second service available for the user instead of a first service, which is a service subscribed for the user, the method executed at a policy controller 70. In particular, and with reference to FIG. 1, the policy controller 70 illustrated in FIG. 7 may be the PCRF server 1 of the PCC architecture.

As shown in FIG. 10, this method comprises a step S-1010 of transmitting, to a policy enforcer 80, a control rule for the first service, which is a service subscribed for a user.

This method further comprises a step S-1020 of receiving, from the policy enforcer, an identifier of the first service, hereinafter first service identifier, indicating that the first service is used by the user; a step S-1030 of obtaining, from a subscription repository and by using the first service identifier, an identifier of a second service, hereinafter second service identifier, associated with a same service category as the received first service identifier; and a step S-1040 of triggering, towards the user, an offer to accept using the second service instead of the used first service.

Further, this method also comprises a step S-1050 of receiving, from the policy enforcer 80, a request for control rules for the second service for the user; and a step S-1060 of transmitting, to the policy enforcer, a control rule for the second service for the user.

Also in this method, the second service may be a service for which data connectivity is sponsored by a Sponsor and is hereinafter referred to as a sponsored service, and the first service may be a service subject to a quota subscribed for the user and is hereinafter referred to as a quoted service.

In particular, and with reference to an exemplary embodiment illustrated in FIG. 4 where the second service is a sponsored service and the first service is a quoted service, triggering towards the user the offer to accept using the sponsored service may comprise a step S-435 of transmitting, to the policy enforcer, an indication to offer the user an acceptance of using the sponsored service instead of the used quoted service. In the context of first and second services, triggering towards the user the offer to accept using the second service may comprise transmitting, to the policy enforcer, an indication to offer the user an acceptance of using the second service instead of the used first service.

Alternatively, and with reference to an exemplary embodiment illustrated in FIG. 5 where the second service is a sponsored service and the first service is a quoted service, triggering towards the user the offer to accept using the sponsored service may comprise a step S-540 of transmitting, to the user, the offer to accept using the sponsored service instead of the used quoted service. In the context of first and second services, triggering towards the user the offer to accept using the second service may comprise transmitting, to the user, the offer to accept using the second service instead of the used first service.

Generally speaking, transmitting the control rule for the first service, which is a service subscribed for the user, may be responsive to receiving, from the policy enforcer, a request for control rules for services subscribed for the user. In this respect, this method may further comprise obtaining from the subscription repository the first service identifier for the first service, which is a service subscribed for the user.

In embodiments of this method, and with reference to exemplary embodiments illustrated in FIG. 4 and FIG. 5 where the second service is a sponsored service and the first service is a quoted service, obtaining the sponsored service identifier may comprise respective steps S-425 and S-525 of transmitting, to the subscription repository, the quoted service identifier for the user; and respective steps S-430 and S-530 of receiving, from the subscription repository, the sponsored service identifier. In the context of first and second services, obtaining the second service identifier may comprise transmitting, to the subscription repository, the first service identifier for the user; and receiving, from the subscription repository, the second service identifier.

Participating in this method and exemplary embodiments there is provided a policy controller 70, as schematically illustrated in FIG. 7.

In accordance with an embodiment, the policy controller 70 may comprise, as shown in FIG. 7, a memory 718 configured to store a control rule for a first service, which is a service subscribed for a user; and a rules handler 726 configured to transmit, to a policy enforcer 80 via a transmitter 740, said control rule the first service, which is a service subscribed for the user.

Also in accordance with this embodiment, the policy controller 70 may comprise, as shown in FIG. 7, a service handler 728 configured to receive, from the policy enforcer via a receiver 730, an identifier of the first service, hereinafter first service identifier, indicating that the first service is used by the user; a processor 720 configured to obtain, from a subscription repository and by using the first service identifier, an identifier of a second service, hereinafter second service identifier, associated with a same service category as the received first service identifier; and a sponsoring handler 724 configured to trigger, towards the user via the transmitter 740, an offer to accept using the second service instead of the used first service.

Further in this embodiment, the rules handler 726 is configured to receive, from the policy enforcer via the receiver 730, a request for control rules for the second service for the user, and transmit, to the policy enforcer via the transmitter 740, a control rule for the second service.

The policy controller 70 shown in FIG. 7 may also comprise at least one processor 720 and at least one memory 710, both in communication with each other, with the sponsoring handler 724, the rules handler 726, the service handler 728, the receiver 730 and the transmitter 740, and with other elements or units of the policy controller 70. The at least one memory 710 may comprise volatile and/or non-volatile memory. In particular, the at least one memory 710 may have a computer program 714 and data 718 stored therein. The computer program 714 may be loaded in the at least one memory 710 from a computer program product 750, such as any non-transitory computer readable medium, in which the computer program is stored. The data 718 may comprise the control rules for one or more first services subscribed for the user, e.g. quoted services, and the control rules for one or more second services available to the user, e.g. sponsored services. The at least one processor 720 may be configured to carry out the functions of the sponsoring handler 724, the rules handler 726 and the service handler 728.

In accordance with a further embodiment, the policy controller 70 may comprise, as shown in FIG. 7, at least one processor 720, and at least one memory 710 that stores processor-executable instructions 714. In this policy controller, the at least one processor interfaces with the at least one memory to execute the processor-executable instructions, so that the policy controller is operable to perform the actions disclosed in the following.

The policy controller is thus operable to transmit, to a policy enforcer via a transmitter 740, a control rule for a first service, which is a service subscribed for a user, as carried out during the step S-1010 in the above method.

The policy controller is also operable to receive, from the policy enforcer via a receiver 730, an identifier of the first service, hereinafter first service identifier, indicating that the first service is used by the user, as carried out during the step S-1020 in the above method; obtain, from a subscription repository 60 and by using the first service identifier, an identifier of a second service, hereinafter second service identifier, associated with a same service category as the received first service identifier, as carried out during the step S-1030 in the above method; and trigger, towards the user via the transmitter 740, an offer to accept using the second service instead of the used first service, as carried out during the step S-1040 in the above method.

The policy controller is also operable to receive, from the policy enforcer via a receiver 730, a request for control rules for the second service for the user, as carried out during the step S-1050 in the above method; and transmit, to the policy enforcer via the transmitter 740, a control rule for the second service for the user, as carried out during the step S-1060 in the above method.

In both embodiments for this policy controller 70, the second service may be a service for which data connectivity is sponsored by a Sponsor and is hereinafter referred to as a sponsored service, and the first service may be a service subject to a quota subscribed for the user and is hereinafter referred to as a quoted service.

In both embodiments, and in order to trigger the offer, the policy controller 70 may further be operable to transmit, to the policy enforcer via the transmitter, an indication to offer, from the policy enforcer to the user, acceptance of using the second service instead of the used first service. In particular and where the second service is a sponsored service and the first service is a quoted service, the policy controller 70 may further be operable to transmit, to the policy enforcer via the transmitter, an indication to offer, from the policy enforcer to the user, acceptance of using the sponsored service instead of the used quoted service.

Also in both embodiments, and in order to trigger the offer, the policy controller 70 may further be operable to transmit, to the user via the transmitter, the offer to accept using the second service instead of the used first service. In particular and where the second service is a sponsored service and the first service is a quoted service, the policy controller 70 may further be operable to transmit, to the user via the transmitter, the offer to accept using the sponsored service instead of the used quoted service.

In particular and in both embodiments, the policy controller 70 may further be operable to transmit via the transmitter the control rule for the first service, which is a service subscribed for the user, in response to receiving, from the policy enforcer via the receiver, a request for control rules for services subscribed for the user.

Further in both embodiments, and in order to obtain the second service identifier, the policy controller may further be operable to transmit, to the subscription repository via the transmitter, the first service identifier for the user, and receive, from the subscription repository via the receiver, the second service identifier. In particular and where the second service is a sponsored service and the first service is a quoted service, the policy controller 70 may further be operable to transmit, to the subscription repository via the transmitter, the quoted service identifier for the user, and receive, from the subscription repository via the receiver, the sponsored service identifier.

Still further in both embodiments, the policy controller may further be operable to obtain, from the subscription repository via the receiver, the first service identifier identifying the first service, which is a service subscribed for the user.

FIG. 11 illustrates a method for notifying a user of a second service available for the user instead of a first service, which is a service subscribed for the user, the method executed at a policy enforcer 80. In particular, and with reference to FIG. 1, the policy enforcer 80 illustrated in FIG. 8 may be any one of a PCEF device 2, a BBERF device 9 and a TDF device 4 of the PCC architecture.

As shown in FIG. 11, this method comprises a step S-1110 of receiving, from a policy controller, a control rule for the first service, which is a service subscribed for a user; a step S-1120 of enforcing the control rule for the first service; a step S-1130 of detecting the first service is used by the user; and a step S-1140 of transmitting, to the policy controller, an identifier of the first service, hereinafter first service identifier, indicating that the first service is used by the user.

This method further comprises, upon detecting the second service being in use by the user, a step S-1150 of obtaining, from the policy controller, a control rule for the second service; a step S-1160 of removing the control rule for the first service; and a step S-1170 of enforcing the control rule for the second service.

Also in this method, the second service may be a service for which data connectivity is sponsored by a Sponsor and is hereinafter referred to as a sponsored service, and the first service may be a service subject to a quota subscribed for the user and is hereinafter referred to as a quoted service.

Given that a quoted service is a service subject to a quota subscribed for the user, upon detecting the quoted service is used by the user, this method may further comprise a step of determining a quota to report quota usage for the quoted service. Where this is the case, upon detecting the sponsored service being in use by the user, the method may further comprise reporting the quota usage for the quoted service previously used.

This method may also comprise, in accordance with the exemplary embodiment illustrated in FIG. 4 where the second service is a sponsored service and the first service is a quoted service and further discussed, a step S-435 of receiving, from the policy controller, an indication to offer the user an acceptance for using the second service, e.g. sponsored service, instead of the used first service, e.g. quoted service. Where this is the case, the method may further comprise a step S-440 of notifying the user of the second service, e.g. sponsored service and, upon the acceptance by the user, redirecting the user to start using the second service, e.g. sponsored service.

Participating in this method and exemplary embodiments there is provided a policy enforcer 80, as schematically illustrated in FIG. 8.

In accordance with an embodiment, the policy enforcer 80 may comprise, as shown in FIG. 8, a memory 818 configured to store a control rule for a first service, which is a service subscribed for a user; and a rules enforcer 828 configured to receive, from a policy controller 70 via a receiver 830, the control rule for the first service, which is a service subscribed for the user, and enforce said control rule for the first service.

Also in accordance with this embodiment, the policy enforcer 80 may comprise, as shown in FIG. 8, a service detector 826 configured to detect the first service is used by the user, transmit, to the policy controller via a transmitter 840, an identifier of the first service, hereinafter first service identifier, indicating that the first service is used by the user, and detect a second service being in use by the user.

Still in accordance with this embodiment, the policy enforcer 80 shown in FIG. 8 may comprise a sponsoring handler 824 configured to obtain, from the policy controller via the receiver 830, a control rule for the second service. Where this is the case, the rules enforcer 828 may further be configured to remove the control rule for the first service, and enforce the control rule for the second service.

The policy enforcer 80 shown in FIG. 8 may also comprise at least one processor 820 and at least one memory 810, both in communication with each other, with the sponsoring handler 824, the rules enforcer 828, the service detector 826, the receiver 830 and the transmitter 840, and with other elements or units of the policy enforcer 80. The at least one memory 810 may comprise volatile and/or non-volatile memory. In particular, the at least one memory 810 may have a computer program 814 and data 818 stored therein. The computer program 814 may be loaded in the at least one memory 810 from a computer program product 850, such as any non-transitory computer readable medium, in which the computer program is stored. The data 818 may comprise the control rules for one or more first services subscribed for the user, e.g. quoted services, and the control rules for one or more second services available to the user, e.g. sponsored services. The at least one processor 820 may be configured to carry out the functions of the sponsoring handler 824, the rules enforcer 828 and the service detector 826.

In accordance with a further embodiment, the policy enforcer 80 may comprise, as shown in FIG. 8, at least one processor 820, and at least one memory 810 that stores processor-executable instructions 814. In this policy enforcer, the at least one processor interfaces with the at least one memory to execute the processor-executable instructions, so that the policy enforcer is operable to perform the actions disclosed in the following.

The policy enforcer is thus operable to receive, from a policy controller via a receiver 830, a control rule for a first service, which is a service subscribed for a user, as carried out during the step S-1110 in the above method, and enforce, with a processor 820, the control rule for the first service, as carried out during the step S-1120 in the above method.

The policy enforcer is further operable to detect, with the processor 820, the first service is used by the user, as carried out during the step S-1130 in the above method, and transmit, to the policy controller via a transmitter 840, an identifier of the first service, hereinafter first service identifier, indicating that the first service is used by the user, as carried out during the step S-1140 in the above method, in order to check if there is an alternative second service to use instead of the first service.

Then, the policy enforcer is still further operable to detect, with the processor 820, a second service being in use by the user, and obtain, from the policy controller via the receiver 830, a control rule for the second service, as carried out during the step S-1150 in the above method. Where this is the case, the policy enforcer is further operable to remove, with the processor 820, the control rule for the first service, as carried out during the step S-1160 in the above method, and enforce, with the processor 820, the control rule for the second service, as carried out during the step S-1170 in the above method.

In both embodiments for this policy enforcer 80, the second service may be a service for which data connectivity is sponsored by a Sponsor and is hereinafter referred to as a sponsored service, and the first service may be a service subject to a quota subscribed for the user and is hereinafter referred to as a quoted service.

In both embodiments and where the second service is a sponsored service and the first service is a quoted service, upon detecting the quoted service is used by the user, the policy enforcer 80 may further be operable to determine, with the processor, a quota to report quota usage for the quoted service. Then, upon detecting the sponsored service being in use by the user, the policy enforcer 80 may further be operable to report the quota usage for the quoted service previously used.

Also in both embodiments and irrespective of handling sponsored services and quoted services, the policy enforcer 80 may further be operable to receive, from the policy controller via the receiver 830, an indication to offer the user an acceptance for using the second service instead of the used first service. Where this is the case, the policy enforcer 80 may further be operable to notify the user, via the transmitter, of the second service and, upon the user acceptance, redirect the user, with the processor, to start using the second service.

In this respect, where the second service is a sponsored service and the first service is a quoted service, the policy enforcer 80 may further be operable to receive, from the policy controller via the receiver 830, an indication to offer the user an acceptance for using the sponsored service instead of the used quoted service. In this case, the policy enforcer 80 may further be operable to notify the user, via the transmitter, of the sponsored service and, upon the user acceptance, redirect the user, with the processor, to start using the sponsored service.

The above embodiments of subscription repository, policy controller, policy enforcer and respectively executed methods for notifying a user of a second service allow identifying a first service used by a user and notifying the user of an alternative second service. The alternative second service may be a sponsored service sponsored by a Sponsor and may thus be offered for free, likely for a limited time, and even with better QoS than the quoted service initially used.

An advantage of this solution is that users know in real time other alternative second services so they can choose which the best option is. Operators can offer these alternative second services for free without adding any volume to the user quota and improving QoS to have a better user experience.

More generally speaking, the second service may be an alternative service to the first service in providing for example better quality of service, more extensive service, advertisement free service, different range of service, cheaper service, different bandwidth/speed or different type of service like, for example, extending a speech call to a video call.

Another advantage is that operators can sponsor some complex services, as VoIP or TVoIP, so that these services are not charged since the user accepts to test them as trial for some period of time. A still further advantage is that an enterprise in cloud environment can offer its internal application to their employees instead of external ones.

An embodiment of an exemplary method, showing actions carried out by all entities involved, is discussed in the following with reference to FIG. 2.

An OTT player, who owns a certain service to be sponsored, reaches an agreement with an operator, and the certain service is provisioned in a category database of operator's network as a sponsored service, during a step S-210.

The operator categorizes this sponsored service as pertaining to a certain category (e.g. music or video service), during a step S-220.

The user starts using a quoted service, that is, a service which is not sponsored and is subject to a quota, during a step S-230.

The PCEF identifies the quoted service and asks the category database for an alternative sponsored service, during a step S-240. This category database may be indirectly consulted via the PCRF and SPR.

In the category database, it is determined whether there is an alternative sponsored service in the same category, during a step S-250.

If there is an alternative sponsored service, the PCEF notifies the user of the sponsored service, during a step S-260. If the sponsored service is a browsing service, the PCEF may redirect the user to another web page for accepting the alternative sponsored service. If the sponsored service is not a browsing service, the PCEF may notify to PCRF which sends an SMS towards the user indicating to the user the web page which offers the alternative sponsored service.

If the user accepts using the alternative sponsored service, during a step S-270, the user accesses to the sponsored service, during a step S-290.

If there is no alternative sponsored service or the user refuses using the sponsored service, the user continues using the quoted service, during a step S-280.

As commented above, at least for the embodiment of the exemplary method illustrated in FIG. 2, different embodiments are foreseeable where the sponsored service is a browsing service and where the sponsored service is not a browsing service. These different embodiments are discussed in the following with reference to FIG. 4 and FIG. 5.

FIG. 4 illustrates an exemplary method to be followed in the context of the mentioned quoted service and sponsored service scenario, for an http service in a PCEF scenario (it would be similar for a TDF or BBERF), whereas FIG. 5 illustrates an exemplary method in the context of the mentioned quoted service and sponsored service scenario, for a non-http service. Both figures share most of the steps, and only some steps may be slightly different. Previously, operator and Sponsor have provisioned the database 300 with the corresponding data.

As FIG. 4 illustrates, during a step S-410, an IP Connectivity Access Network (IP-CAN) session is established for a user equipment, hereinafter UE, 10. For example, the IP-CAN session establishment may correspond to a PDP context creation in case the access network is a GPRS network. The IP-CAN session establishment includes a control session establishment between the PCEF device 2 and the PCRF server 1 with a Gx initial Credit Control Request (CCR) message sent from the PCEF device to the PCRF server.

During a step S-415, the UE 10 starts a quoted service A. This quoted service A is an http request. This volume is charged in OCS 7 from the PCEF device 2, or by local CDRs in the PCEF device. If there is an OCS 7 involved, there is a Diameter Gy dialog established between the PCEF device 2 and the OCS 7, which is not illustrated for the sake of simplicity, to grant a quota for the quoted service A and to report the quota usage.

During a step S-420, the PCEF device identifies the quoted service A and, with a CCR update message transmits the corresponding information for the quoted service A, including an identifier of the quoted service A, towards the PCRF server via the Gx interface, i.e. an APPLICATION_START event trigger.

During a step S-425, the PCRF server 1 queries a category database, which in particular may be the SPR 3, the UDR 8, or the category database 300 illustrated in FIG. 3 (local or external to the PCRF server), to obtain an alternative sponsored service, if any, with a same category as the quoted service A. A Lightweight Directory Access Protocol (LDAP) may be a possible protocol for this query but other protocols are possible.

During a step S-430, the PCRF server 1 receives from the category database one or more alternative sponsored services with the same category as the quoted service A and/or the category shared by the quoted service A and the alternative sponsored services; and the UE will be given the chance to select one of them in a subsequent step. For the sake of simplicity, just a sponsored service B is considered in the following.

During a step S-435, the PCRF server 1 answers the CCR update message to the PCEF device 2 with a Gx Credit Control Answer (CCA) update message including a redirect indication to a Web portal 11, which in particular may be a Sponsor node or an ASP node, and also including an identifier of the sponsored service B and/or the category as a parameter.

During a step S-440, the PCEF device 2 transmits to the UE 10 an HTTP message (status code 302) indicating that the UE is redirect to an operator Web portal. The identifier of the quoted service A and/or the category are sent as parameters in the 302 message so that the Web portal may display to the UE the correct web page: e.g. "You are trying to access service A; if you are interested, we offer you free rate access to a similar sponsored service. Please click in the link below if you are interested".

During a step S-445, the UE accesses to the Web portal 11, the UE is authenticated therein, and then it is displayed a selection menu with the alternative one or more sponsored service offered (likely based on the category which was included as a parameter in the redirect message in previous step). Then, it is also displayed a further selection menu to choose whether the UE wants to be redirected automatically to the sponsored service/s or never be asked again.

As commented above, the Web portal may offer one or more alternative sponsored services for the user to select one of them to be used instead of the currently used quoted service A.

For example, the one or more selection menus may present: Sponsored service B is offering a similar service to service A. The sponsor is offering a free volume service. Do you want to be redirected? YES or NO In case of positive answer (YES). The following message appears:
Do you want to be redirected for this type of service? Options:
Always; Only once
In case of negative answer (NO). The following message appears:
Do you want to be redirected to the web portal every time there is an alternative sponsored service?
Always; No Generally speaking, a subscriber profile for the UE may be updated in accordance with the answers in the subscription repository 60, the SPR 3 o the UDR 8 as the case might be.

Then, during a step S-450, the UE 10 is redirected to start using the selected sponsored service B through the Internet 12, which in particular may include and/or involve a Sponsor node or an ASP node.

During a step S-455, the UE starts running the sponsored service B, which is not charged, or it is charged with a lower rate. This can be performed by local CDRs in the PCEF device 2, or by the OCS 7. If the OCS 7 is involved, there is a Diameter Gy dialog between the PCEF device and the OCS to grant quota and to report the quota usage, Apart from that, upon the PCEF device detecting the quoted service A not being used any longer, the PCEF device reports the final quota usage for the quoted service A towards the OCS 7.

Then, during a step S-460, the PCEF device transmits again a Gx CCR update message with the corresponding information for the sponsored service B, including an identifier of the sponsored service B, towards the PCRF server 1.

During a step S-465, the PCRF server 1 answers with a corresponding Gx CCA update message, with new control rules for the sponsored service B, to the PCEF device 2.

The PCEF device installs the control rules for the sponsored service B, which may include time of day (ToD) conditions since the offer is for a limited period, and including a so-called RG AVP with a value indicating the sponsored service B is free of charge (at this moment this service is free of charge); and a QoS-Information AVP with a QCI value indicating better QoS than the one for default bearer, and this QoS-Information AVP results in triggering a dedicated bearer to carry the traffic for the sponsored service B.

The PCEF device, then, removes the control rules for the quoted service A, so that e.g. the PCEF drops packets for quoted service A or lets them pass but carries them over the default bearer, i.e. with default QoS.

During a step S-470, the sponsored service B runs with the new control rules enforced for the sponsored service B, that is, with a better quality and for free.

Not illustrated in any drawing, and optionally, the policy controller 70, e.g. the PCRF server 1, or the subscription repository 60, e.g. the SPR 3, may inform a Software Defined Networking (SDN) controller of that UE which decides to be redirected always to the alternative sponsored service (those who answers YES; always to the first question in step S-445).

For example, the PCRF server 1 may report, using e.g. a HTTP Post message, to the SDN Controller the flow information which identifies this UE with this sponsored service. This flow information is typically composed of the source IP address (IP address of the UE), and the destination IP address (IP address of sponsored service B). Then, the SDN controller installs filters (corresponding to the above flow information) in the SDN network so that SDN nodes can provide a better QoS to this sponsored service. Also, the SDN controller may include into the service path (depending on the sponsored service B) other nodes which can increase the user experience of this sponsored service. For example, if the sponsored service B is a video web service, the SDN controller may include a video optimizer node for this sponsored service B.

As commented above, FIG. 5 illustrates a quite similar embodiment as the one shown in FIG. 4.

As FIG. 5 illustrates, during a step S-510, an IP-CAN session is established for a UE 10. For example, the IP-CAN session establishment may correspond to a PDP context creation in case the access network is a GPRS network. The IP-CAN session establishment includes a control session establishment between the PCEF device 2 and the PCRF server 1 with a Gx initial CCR message sent from the PCEF device to the PCRF server, which is conventionally answered with a Gx initial CCA message, including control rules for subscribed services for the UE, from the PCRF server to the PCEF device.

During a step S-515, the UE 10 starts a quoted service A. This quoted service A does not correspond to an http service. This volume is charged in OCS 7 from the PCEF device 2, or by local CDRs in the PCEF device. If there is an OCS 7 involved, a Diameter Gy dialog is established between the PCEF device 2 and the OCS 7, which is not illustrated for the sake of simplicity, to grant a quota for the quoted service A and to report the quota usage.

During a step S-520, the PCEF device identifies the quoted service A and, with a CCR update message, transmits the corresponding information for the quoted service A, including an identifier of the quoted service A, towards the PCRF server via the Gx interface.

During a step S-525, the PCRF server 1 queries a category database, e.g. the SPR 3, the UDR 8, or the category database 300 illustrated in FIG. 3 (local or external to the PCRF server), to obtain an alternative sponsored service, if any, with a same category as the quoted service A. A Lightweight Directory Access Protocol (LDAP) may be a possible protocol for this query but other protocols are possible.

During a step S-530, the PCRF server 1 receives from the category database one or more alternative sponsored services with the same category as the quoted service A and/or the category shared by the quoted service A and the alternative sponsored services; and the UE will be given the chance to select one of them in a subsequent step. For the sake of simplicity, just a sponsored service B is considered in the following.

During a step S-535, the PCRF server 1 answers the CCR update message to the PCEF device 2 with a Gx CCA update message, which might include an identifier of the sponsored service B and/or the category as a parameter.

Unlike the embodiment shown in FIG. 4, the current quoted service A is not an http service. In this case, during a step S-540, the PCRF server transmits an SMS for the UE towards a SMSC (not depicted in FIG. 5 for the sake of simplicity). This SMS includes a link to the Web portal 11, which in particular may be a Sponsor node or an ASP node, along with an identifier of the quoted service A, an identifier of the sponsored service B and/or the category that both services share.

During a step S-545, the UE accesses to the Web portal 11, the UE is authenticated therein, and then it is displayed a selection menu with the alternative one or more sponsored service offered (likely based on the category which was included as a parameter in the redirect message in previous step). The procedure to select a sponsored service, amongst one or more alternative sponsored service, and the corresponding questions and answers may be the same as commented above with reference to FIG. 4.

Then, during a step S-550, the UE may download and install an application to run the alternative sponsored service B, instead of the currently used quoted service A, through the Internet 12, which in particular may include and/or involve a Sponsor node or an ASP node.

During a step S-555, the UE starts running the sponsored service B, which is not charged, or it is charged with a lower rate, by using local CDRs in the PCEF device 2, or by the OCS 7. If the OCS 7 is involved, there is a Diameter Gy dialog between the PCEF device and the OCS to grant quota and to report the quota usage, Apart from that, upon the PCEF device detecting the quoted service A not being used any longer, the PCEF device reports the final quota usage for the quoted service A towards the OCS 7.

During a step S-560, the PCEF device transmits again a Gx CCR update message with the corresponding information for the sponsored service B, including an identifier of the sponsored service B, towards the PCRF server 1.

During a step S-565, the PCRF server 1 answers with a corresponding Gx CCA update message, with new control rules for the sponsored service B, to the PCEF device 2.

The PCEF device installs the control rules for the sponsored service B, and removes the control rules for the quoted service A, as discussed above with reference to the embodiment illustrated in FIG. 4.

During a step S-570, the sponsored service B runs with the new control rules enforced for the sponsored service B, that is, with a better quality and for free.

Generally speaking and applicable to any embodiment discussed above, after expiry of a possible time period, which makes the sponsored service be no longer free rate, the policy controller 70, e.g. PCRF server 1, may transmit a Gx Re-Authentication Request (RAR) message to the policy enforcer 80, e.g. PCEF device or TDF device, to indicate a control rule modification for the sponsored service B.

This control rule modification may include a RG AVP with a value indicating that the sponsored service B is not for free any longer. Regarding the QoS-Information, there may be two options: either this AVP is not included, which means the sponsored service B is still prioritized with the same QoS as before on a dedicated bearer, or the QoS-Information AVP includes a QCI value indicating a same value as for the default bearer, which results in removing the dedicated bearer, so that the sponsored service B is to be carried over the default bearer from now on, i.e. not prioritized anymore.

Additionally, for HTTP services, the policy controller may include in the control rule an HTTP redirection message (302), which redirects the UE to a web page indicating that the sponsored service B is not for free any longer. Alternatively, for non-HTTP services, the policy controller may send an SMS to the UE, upon expiry of the possible time period, indicating that the sponsored service B is not for free any longer.

The invention may also be practised by a computer program, loadable into an internal memory of a computer with input and output units as well as with a processing unit. This computer program comprises executable code adapted to carry out the above method steps when running in the computer. In particular, the executable code may be recorded in a carrier readable means in a computer.

As used throughout the present specification, the word "comprising" does not exclude the presence of other elements or steps than those listed and the words "a" or "an" preceding an element do not exclude the presence of a plurality of such elements.

The invention is described above in connection with various embodiments that are intended to be illustrative and non-restrictive. It is expected that those of ordinary skill in this art may modify these embodiments. The scope of the invention is defined by the claims in conjunction with the description and drawings, and all modifications that fall within the scope of the claims are intended to be included therein.

The invention claimed is:

1. A method for notifying a user of a second service available for the user instead of a first service, which is a service subscribed for the user, the method executed at a policy controller and comprising the steps of:
   transmitting, to a policy enforcer, a control rule for the first service, which is a service subject to a quota subscribed for the user and is hereinafter referred to as a quoted service;
   receiving, from the policy enforcer, an identifier of the quoted service, hereinafter referred to as a first service identifier, indicating that the quoted service is used by the user;
   obtaining, from a subscription repository and by using the first service identifier, an identifier of the second service, hereinafter referred to as a second service identifier, associated with a same service category as the received first service identifier, wherein obtaining the second service identifier comprises transmitting the first service identifier to the subscription repository and receiving the second service identifier from the subscription repository, and wherein the second service comprises a service for which data connectivity is sponsored by a sponsor and is hereinafter referred to as a sponsored service;
   triggering, towards the user, an offer to accept using the sponsored service instead of the used quoted service;
   receiving, from the policy enforcer, a request for control rules for the sponsored service for the user; and
   transmitting, to the policy enforcer, a control rule for the sponsored service.

2. The method of claim 1, wherein triggering towards the user the offer to accept using the sponsored service comprises transmitting to the policy enforcer an indication to offer the user an acceptance of using the sponsored service instead of the used quoted service.

3. The method of claim 1, wherein triggering towards the user the offer to accept using the sponsored service comprises transmitting to the user the offer to accept using the sponsored service instead of the used quoted service.

4. The method of claim 1, wherein transmitting the control rule for the quoted service, which is the service subscribed for the user, is responsive to receiving, from the policy enforcer, a request for control rules for services subscribed for the user.

5. The method of claim 1, further comprising obtaining from the subscription repository the first service identifier identifying the quoted service, which is the service subscribed for the user.

6. An apparatus for providing control rules to be enforced for services subscribed for a user of a telecommunication network, and comprising:
   at least one processor; and
   at least one memory that stores processor-executable instructions, wherein the at least one processor interfaces with the at least one memory to execute the processor-executable instructions, whereby said apparatus is operable to:
   transmit, to a policy enforcer via a transmitter, a control rule for a first service, which is a service subject to a quota subscribed for a user and is hereinafter referred to as a quoted service;
   receive, from the policy enforcer via a receiver, an identifier of the quoted service, hereinafter referred to as a first service identifier, indicating that the quoted service is used by the user;
   obtain, from a subscription repository and by using the first service identifier, an identifier of a second service, hereinafter referred to as a second service identifier, associated with a same service category as the received first service identifier, wherein in order to obtain the second service identifier the apparatus is further operable to transmit the first service identifier to the subscription repository and receive the second service identifier from the subscription repository, and wherein the second service comprises a service for which data connectivity is sponsored by a sponsor and is hereinafter referred to as a sponsored service;
   trigger, towards the user via the transmitter, an offer to accept using the sponsored service instead of the used quoted service;
   receive, from the policy enforcer via the receiver, a request for control rules for the sponsored service for the user; and transmit, to the policy enforcer via the transmitter, a control rule for the sponsored service.

7. The apparatus of claim 6, wherein in order to trigger the offer, the apparatus is further operable to transmit, to the user via the transmitter, the offer to accept using the sponsored service instead of the used quoted service.

8. The apparatus of claim 6, wherein the apparatus is one of a policy controller and a policy and charging rules function (PCRF) server.

9. The apparatus of claim 6, wherein in order to trigger the offer, the apparatus is further operable to transmit, to the policy enforcer via the transmitter, an indication to offer, from the policy enforcer to the user, acceptance of using the sponsored service instead of the used quoted service.

10. The apparatus of claim 6, further operable to transmit, via the transmitter, the control rule for the quoted service, which is the service subscribed for the user, in response to receiving, from the policy enforcer via the receiver, a request for the control rules for the services subscribed for the user.

11. The apparatus of claim 6, further operable to obtain, from the subscription repository via the receiver, the first service identifier identifying the quoted service, which is the service subscribed for the user.

12. A system comprising the apparatus of claim 6, further comprising:

the subscription repository which is operable to:
   store the first service identifier;
   store the second service identifier;
   associate the first service identifier and the second service identifier with the same service category;
   receive, from the apparatus, the first service identifier;
   determine the second service identifier associated with the same service category as the received first service identifier; and
   transmit, to the apparatus, the second service identifier; and the policy enforcer which is operable to:
   receive, from the apparatus, the control rule for the quoted service, which is the service subscribed for the user;
   enforce the control rule for the quoted service;
   detect the quoted service is used by the user;
   transmit, to the apparatus, the first service identifier indicating that the quoted service is used by the user;
   detect the sponsored service being in use by the user;
   obtain, from the apparatus, the control rule for the sponsored service;
   remove the control rule for the quoted service; and
   enforce the control rule for the sponsored service.

\* \* \* \* \*